US012726362B1

(12) United States Patent
Clark et al.

(10) Patent No.: US 12,726,362 B1
(45) Date of Patent: Sep. 1, 2026

(54) DELEGATED DEVICE AUTHENTICATION BETWEEN TRUSTED DEVICES

(71) Applicant: Amazon Technologies, Inc., Seattle, WA (US)

(72) Inventors: Jonathan Clark, Seattle, WA (US); Chirag Deepak Agrawal, San Francisco, CA (US); Sachin Balaso Shinde, Pflugerville, TX (US)

(73) Assignee: Amazon Technologies, Inc., Seattle, WA (US)

( * ) Notice: Subject to any disclaimer, the term of this patent is extended or adjusted under 35 U.S.C. 154(b) by 93 days.

(21) Appl. No.: 18/965,705

(22) Filed: Dec. 2, 2024

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01); *H04L 9/3213* (2013.01); *H04L 9/3271* (2013.01)

(58) Field of Classification Search
CPC ... H04L 9/3247; H04L 9/0825; H04L 9/3213; H04L 9/3271
USPC .......... 713/176, 155, 156, 169, 172; 380/45; 705/1.1
See application file for complete search history.

(56) References Cited

U.S. PATENT DOCUMENTS 9,172,699 B1 * 10/2015 Vazquez ............. H04L 63/0861
9,191,381 B1 * 11/2015 Popp ................... H04L 63/0823
9,264,419 B1 * 2/2016 Johansson ............... G06F 21/45
9,503,452 B1 * 11/2016 Kumar ................ H04L 63/0838
10,089,983 B1 * 10/2018 Gella ...................... G10L 15/22

(Continued)

FOREIGN PATENT DOCUMENTS

WO WO-2026030384 A1 * 2/2026 ........... H04L 9/3231

OTHER PUBLICATIONS

Hayashi, V. T., & Ruggiero, W. V. (2022). Hands-free authentication for virtual assistants with trusted IoT device and machine learning. Sensors, 22(4), 1325. (Year: 2022).*

(Continued)

*Primary Examiner* — Philip J Chea
*Assistant Examiner* — Dorianne Alvarado David
(74) *Attorney, Agent, or Firm* — K&LGates LLP

(57) ABSTRACT

Systems, apparatuses, and methods are described for delegated device authentication. An example method includes receiving, from a first device, a request to access enterprise data managed by an enterprise service. The example method also includes determining a security status of the first device, where the security status indicates that the first device complies with a set of conditional access policies. The example method also includes determining, based on execution of a first authentication mechanism having a first confidence rating, an account associated with a natural language processing system. The example method also includes receiving, from a second device, an authentication response indicating an execution of a second authentication mechanism having a second confidence rating and authenticating the first account based on the authentication response. The example method also includes initiating a delegated authentication session for the first device during which the first device is authorized to access the enterprise data.

20 Claims, 8 Drawing Sheets

(56) References Cited

U.S. PATENT DOCUMENTS

| | | | | |
|---|---|---|---|---|
| 11,640,453 | B2 * | 5/2023 | Gorsica, IV | G06F 21/34<br>726/19 |
| 12,335,255 | B1 * | 6/2025 | Piri | H04L 63/083 |
| 12,499,444 | B1 * | 12/2025 | Stennett | G06Q 20/3552 |
| 12,525,243 | B2 * | 1/2026 | Lim | G06F 3/167 |
| 2017/0374176 | A1 * | 12/2017 | Agrawal | G06Q 30/0269 |
| 2018/0007060 | A1 * | 1/2018 | Leblang | H04L 63/107 |
| 2019/0272831 | A1 * | 9/2019 | Kajarekar | G10L 17/06 |
| 2019/0364034 | A1 * | 11/2019 | Alexander | H04L 63/12 |
| 2019/0378499 | A1 * | 12/2019 | Miller | G06F 3/167 |
| 2022/0408259 | A1 * | 12/2022 | Adel | H04W 12/0431 |
| 2023/0146095 | A1 * | 5/2023 | Kim | G06F 9/453<br>726/19 |
| 2024/0118744 | A1 * | 4/2024 | Vaughan | G06V 20/50 |
| 2024/0171380 | A1 * | 5/2024 | Jobard | G06F 21/44 |
| 2024/0259190 | A1 * | 8/2024 | Karthikeyan | G06Q 30/0225 |
| 2024/0422540 | A1 * | 12/2024 | Hopper | H04L 9/3215 |
| 2025/0111356 | A1 * | 4/2025 | Kostovski | G06F 21/31 |
| 2025/0384118 | A1 * | 12/2025 | Pollard | G06F 21/32 |

OTHER PUBLICATIONS

Jana, A. K., & Saha, S. (2021). Natural Language Processing and Artificial intelligence to guarantee security in Decentralized Finance (DeFi). European Journal of Advances in Engineering and Technology, 8(9), 58-63. (Year: 2021).*

Khalil, U., Ahmad, A., Abdel-Aty, A. H., Elhoseny, M., El-Soud, M. W. A., & Zeshan, F. (2021). Identification of trusted IoT devices for secure delegation. Computers & Electrical Engineering, 90, 106988. (Year: 2021).*

Steffen, R., & Knorr, R. (2005). A trust based delegation system for managing access control. na. (Year: 2005).*

* cited by examiner

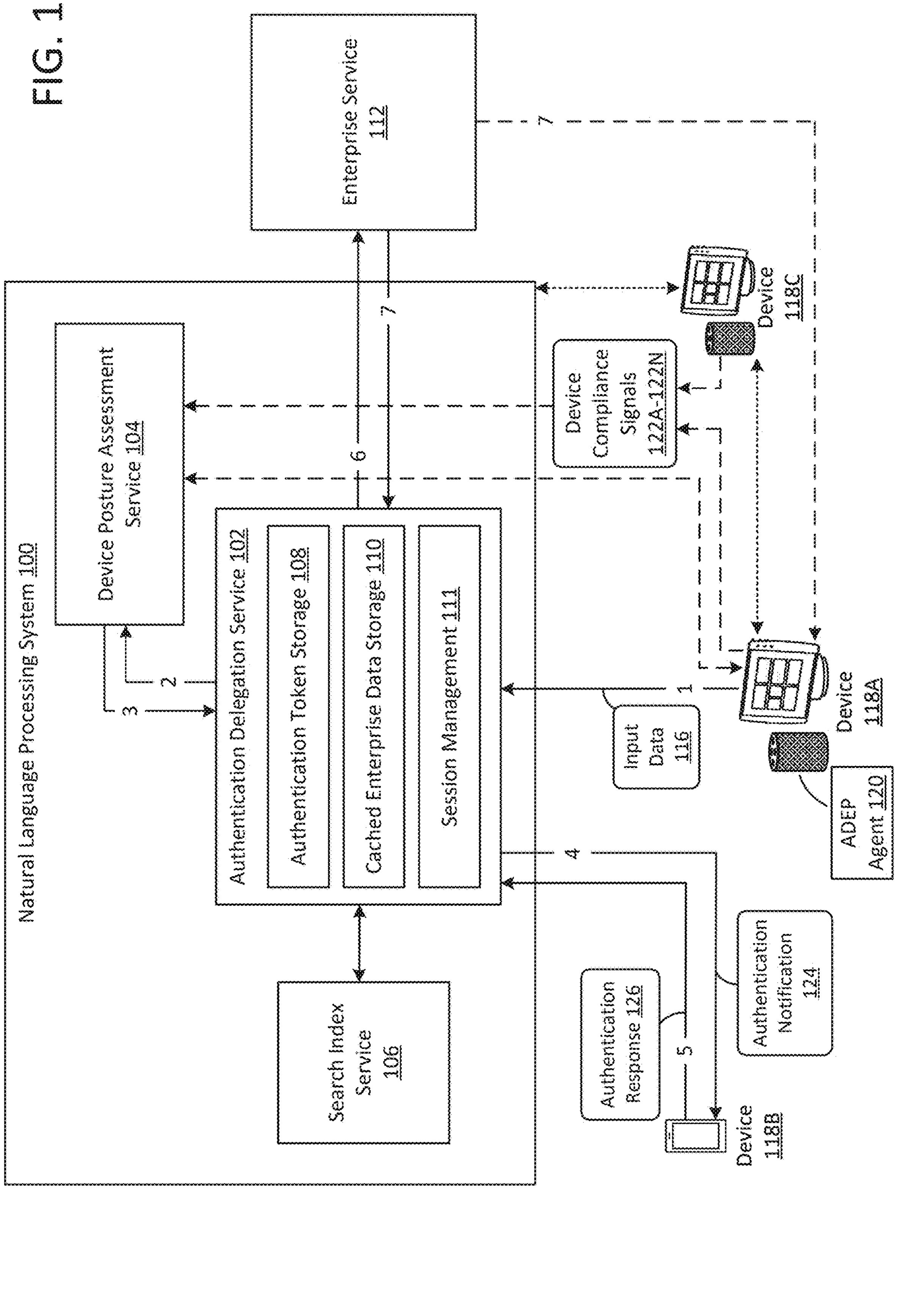

FIG. 1
Natural Language Processing System 100
Device Posture Assessment Service 104
Enterprise Service 112
Authentication Delegation Service 102
Authentication Token Storage 108
Cached Enterprise Data Storage 110
Session Management 111
Search Index Service 106
Device Compliance Signals 122A-122N
Input Data 116
Device 118A
Device 118B
Device 118C
ADEP Agent 120
Authentication Notification 124
Authentication Response 126
1
2
3
4
5
6
7
7

Receive an enterprise service account linking request
302

Receive an authentication token associated with an enterprise service account
304

Generate a passkey associated with a first account associated with a natural language processing system
306

Store a public cryptographic key of the passkey with relation to the first account
308

Link the authentication token associated with the enterprise service account to the first account
310

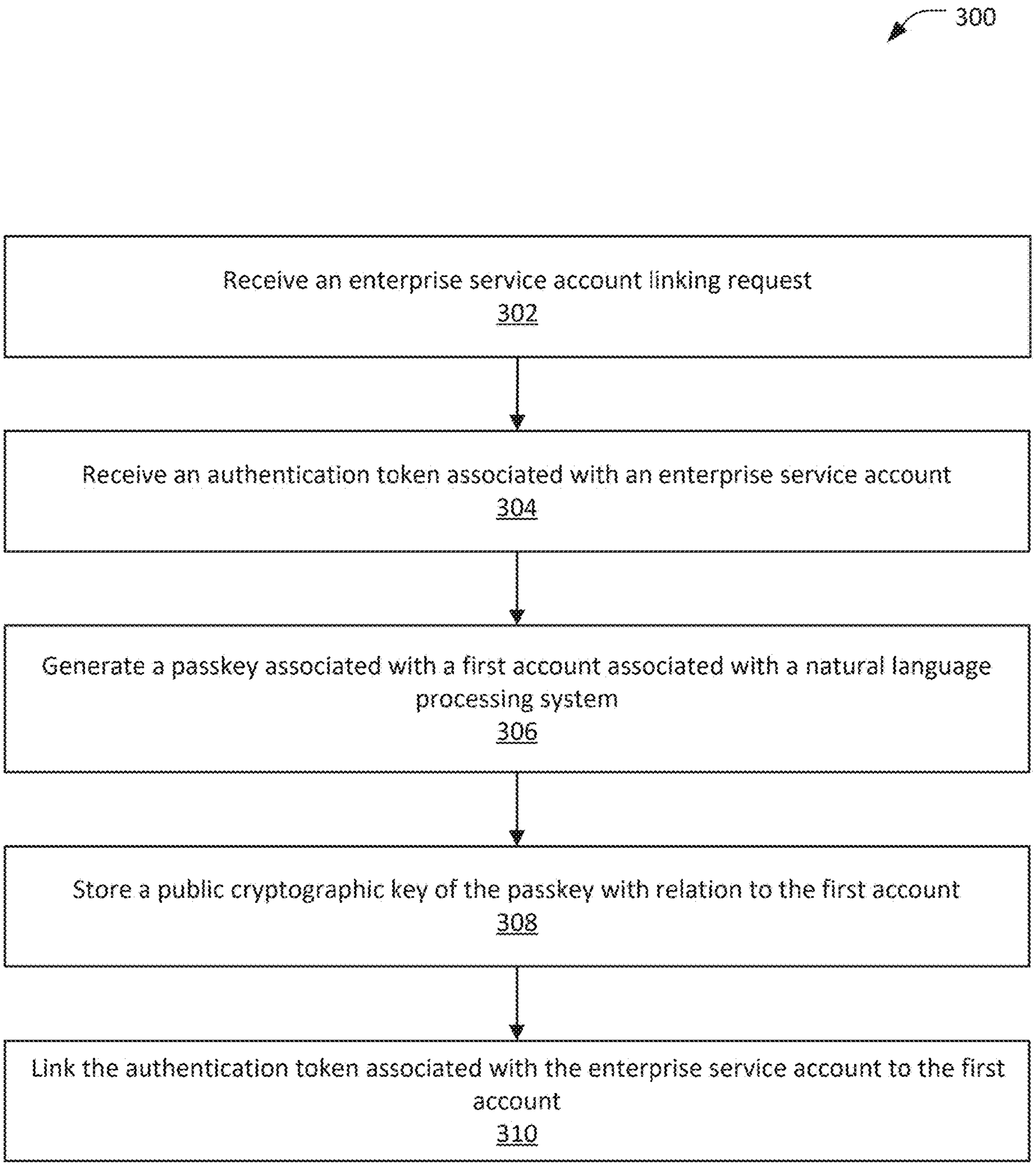

FIG. 3

DELEGATED DEVICE AUTHENTICATION BETWEEN TRUSTED DEVICES

BACKGROUND

In today's connected world, users often desire access to the same or similar data across multiple user devices (e.g., smart home devices, mobile devices, and/or the like). As such, maintaining the security of user data is of vital importance.

BRIEF DESCRIPTION OF DRAWINGS

Reference will now be made to the accompanying drawings, which are not necessarily drawn to scale. Some examples may include fewer or more components than those shown in the figures.

FIG. 1 illustrates an example architecture related to a natural language processing system configured for device authentication delegation in accordance with various aspects of the present disclosure.

FIG. 3 illustrates a flowchart diagram of an example enterprise service account linking process in accordance with various aspects of the present disclosure.

DETAILED DESCRIPTION

Figure 2:
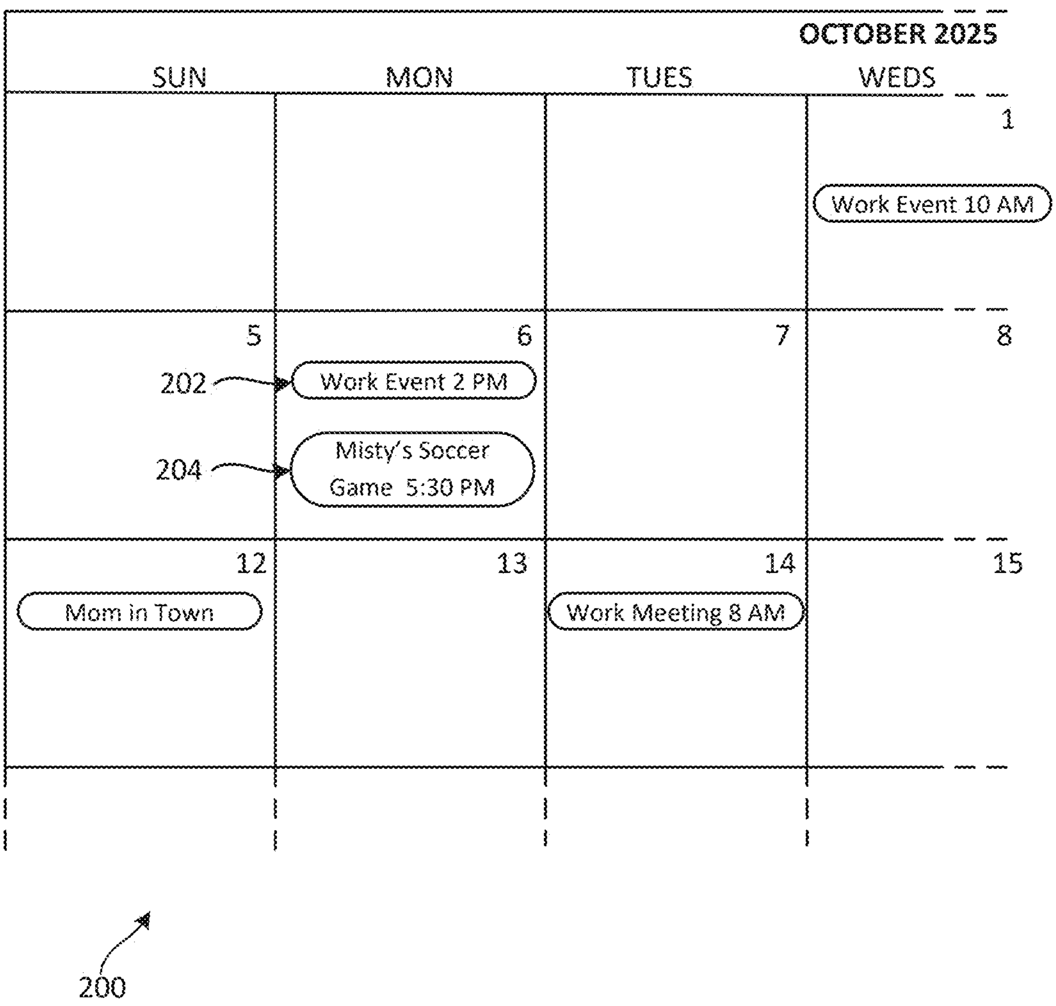
FIG. 2 illustrates an example user interface comprising an interactive calendar displaying obscured enterprise data in accordance with various aspects of the present disclosure.

In the following description, reference is made to the accompanying drawings which illustrate several examples for the present disclosure. It is understood that other examples may be utilized and that mechanical, compositional, structural, and/or electrical operational changes may be made without departing from the spirit and scope of the present disclosure. The following detailed description is not to be taken in a limiting sense, and the scope of the examples of the present invention is defined only by the claims of the issued patent.

Users often desire access to the same or similar data across multiple user devices (e.g., smart home devices, mobile devices, and/or the like), including data associated with various contexts or sensitivity levels. For example, a user may wish to utilize a respective user device such as a smart home device (e.g., a digital assistant device such as an Amazon Echo device, or the like) to access both personal data (e.g., family event data, shopping list data, personal calendar data) and enterprise data (e.g., external data related to the user's place of employment). Allowing a user to access and/or manage both personal data and enterprise data across multiple user devices may enable the respective user to plan various schedules, manage various tasks, efficiently balance personal and work responsibilities, and/or the like.

However, in some scenarios, the enterprise data that a respective user wishes to access across multiple user devices may be sensitive data related to an organizational entity (e.g., the user's place of employment) such as data related to the user's work calendar (e.g., client meeting schedules, internal meeting schedules, organizational events), work correspondence (e.g., correspondence related to the products, services, and/or operations of the organizational entity), co-workers (e.g., personally identifiable information (PII) related to the staff and management of the organizational entity), and/or other private or sensitive data (e.g., data related to a work product). Furthermore, such enterprise data may be managed by an enterprise service (e.g., a third-party (3P) enterprise service) entrusted by the organizational entity to ensure the security of various data related to the organizational entity, including data that may also be associated with the respective user. As such, the enterprise service may enforce various device compliance and/or data security standards to protect against the mishandling (deliberate and/or accidental mishandling) and/or unauthorized exfiltration of enterprise data. Examples of enterprise services configured to manage such enterprise data include, but are not limited to, Microsoft Exchange Online, Google Workspace, Zimbra, IceWarp, Kerio, IBM Notes, and Zoho Mail.

Conventional systems and existing technologies may not be configured to provide seamless and/or simultaneous access to both a user's personal data and enterprise data related to the user (e.g., work calendar data) on multiple devices in a given environment associated with the user (e.g., the user's home) absent individual authentication of each distinct device. In such conventional systems, it may be incumbent upon the user to manually authenticate themselves on each device using traditional credentials like a username and password. Such manual authentication may cause a respective user inconvenience and/or a loss in productivity. Furthermore, traditional user authentication mechanisms using traditional credentials (e.g., a username and password combination) may expose the user devices and/or the data on said user devices to unnecessary risk. For example, traditional credentials are known to be easily stolen and/or forgotten, which may enable bad actors to access data associated with a user and/or an entity associated with the user.

To improve upon such conventional systems and existing technologies, a natural language processing system comprising an authentication delegation service is described herein. In some examples, the authentication delegation service may be configured to unlock enterprise data access for a first device (e.g., a first user device such as a smart home device) by implementing an enhanced use of passkey technology on a second device, where the second device is a trusted device (e.g., a known device under the management of the user such as such as a smartphone). A trusted device may be understood as a known device that is owned and/or managed by a user and/or other entity (e.g., an organizational entity such as the user's employer) that is secured against public interference and may be less likely to be compromised than an untrusted device. As such, various users and/or entities associated with the user may allow a trusted device to access private networks and/or private data, often while enforcing fewer security measures (e.g., user device and/or account authentication measures).

A passkey may be understood as a digital credential associated with a particular device of a respective user and a respective account, profile, service, device, entity, website, and/or the like. The use of a passkey may provide enhanced security as compared to traditional authentication methods. For example, a respective passkey may be associated with specific data that is unique to a particular user, such as biometric data (e.g., fingerprint data), facial profile data, a passcode associated with the particular device, a personal identification number (PIN), and/or the like. In particular, passkeys are phishing resistant and are inherently invulnerable to several forms of password-based attacks, password stealing, and/or biometric credential spoofing. Thus, the identity of the respective user may be securely verified by the authentication delegation service via the second user device (e.g., a mobile device) and, in turn, the first user device (e.g., a smart home device) may be authenticated and trusted. In addition to this enhanced security, the use of a passkey for authentication may provide for streamlined authentication that requires little to no manual effort on the part of the respective user.

Additionally, the authentication delegation service may be configured to maintain device compliance with one or more conditional access policies for multiple trusted devices (e.g., multiple smart home devices) using a combination of device compliance signals from the multiple trusted devices. For example, upon successful completion of a passkey-based authentication challenge on a mobile device of the user (e.g., a biometric authentication, passcode authentication, facial recognition authentication, or the like), the user may access enterprise grade data on the cloud across one or more smart home devices (e.g., digital assistants) in their home during a secure delegated authentication session.

In this regard, the authentication delegation service may be configured to leverage a device posture assessment service to monitor the security status of one or more user devices (e.g., smart home devices) of a respective user, passkeys on a second user device (e.g., a mobile device) of the respective user, and/or authentication tokens (e.g., authentication tokens related to various resources of an enterprise service) managed by the authentication delegation service to strongly authenticate the respective user to access critical information from multiple secure user devices. Device posture, in this context, refers to a current security status of a respective device, where the security status is determined based upon a determination that the device is compliant with one or more conditional access policies. In various examples, user authentication requests generated by a requesting device (e.g., a first user device such as a smart home device) are delegated to a second user device (e.g., a mobile device) with a passkey that has been configured via a software application instance (e.g., a mobile software application) associated with the corresponding natural language processing system for strong out-of-band, multi-factor authentication. Once the identity of the respective user is authenticated based on the passkey, a delegated authentication session may be maintained for one or more additional trusted user devices (e.g., smart home devices) that are co-located in a given environment of the requesting device and associated with the same user identity.

In various examples, the methods described herein satisfy the National Institute of Standards and Technology (NIST) Cybersecurity Framework's Authenticator Assurance Level 2 (AAL2) standards, while achieving minimal friction in the authentication flow related to a respective user. In this regard, the authentication delegation service may enable a respective user to request access to protected resources (e.g., enterprise data) from a user device (e.g., a smart home device) that does not support profile-level strong authentication. Profile-level strong authentication may be understood as user authentication that confirms a user's identity and is more robust than a conventional username and password-based authentication.

In some examples, the authentication delegation service may be configured to leverage a device posture assessment service to ensure that the first user device (the requesting device, e.g., a smart home device) and/or an affiliated software application instance that is requesting enterprise data adheres to a minimum set of security requirements set forth by the enterprise service managing said enterprise data. A respective device posture assessment evaluates a current state or "posture" of a user device to determine a level of security of the user device before allowing access to network resources of the respective enterprise service. The device posture assessment checks for compliance with predefined security policies (aka conditional access policies) related to various aspects of a user device such as the operating system (OS) version, software/firmware patch levels, whether the user device is jailbroken or rooted, and/or the presence of various required security software and/or security certificates. The goal of a device posture assessment is to minimize the risk of compromised user devices accessing sensitive resources related to the enterprise service.

Upon a determination that the first user device (the requesting device, e.g., the smart home device) is compliant with a predetermined set of access policies, the authentication delegation service will attempt to identify the user using weak authentication signals (e.g., signals associated with authentication mechanisms having a first confidence rating (e.g., a false accept rate (FAR) of <5%)), such as voice identification (ID) and/or facial recognition. In doing so, the authentication delegation service may be configured to identify a second user device (e.g., a mobile device such as a smartphone) associated with the identified user and delegate a user authentication request to the second user device. In such examples, the second user device may support authentication mechanisms having a second confidence rating that is stronger than that of the requesting device (e.g., authentication mechanisms with a FAR<0.002%).

In some examples, such delegated authentication is possible in that both the first user device (e.g., the smart home device) and the second user device (e.g., the mobile device) may be configured to provide strong authentication of their respective identities to the authentication delegation service (e.g., based on device profiling and other mechanisms) such that the authentication delegation service may trust both the first user device and the second user device. As such, the authentication delegation service may safely mediate the delegated device authentication for a weaker device (a device capable of facilitating authentication mechanisms having a first (e.g., relatively lower) confidence rating, e.g., the smart home device) with a stronger device (a device capable of facilitating authentication mechanisms having a second (e.g., relatively higher) confidence rating, e.g., the mobile device).

For example, the second user device (e.g., the mobile device) may receive a user authentication request via an authentication notification (e.g., a push notification) and the user may be prompted to complete a local (e.g., on-device) passkey-based authentication challenge associated with a preconfigured passkey (e.g., a biometric challenge (e.g., fingerprint), memorized secret challenge (e.g., passcode), facial recognition challenge, and/or the like) before activating a private cryptographic key to complete the passkey-based authentication. Accordingly, the authentication delegation service provides a form of multi-factor authentication in which the passkey activated by the passkey-based authentication challenge event acts as a first factor of authentication (e.g., something the user is or something the user knows), and the second user device that receives the authentication notification acts as a second factor of authentication (e.g., something the user has).

Upon successful authentication of the user based on the passkey-based authentication challenge, a session management component of the authentication delegation service may initiate a delegated authentication session for the requesting device (e.g., the smart home device). The delegated authentication session may be period of time in which the requesting device (e.g., the smart home device) may be enabled to access enterprise data associated with the user from a respective enterprise service. In some examples, once a delegated authentication session is started, the delegated authentication session will be restricted to the requesting device (e.g., the smart home device). Additionally or alternatively, in some examples, once a delegated authentication session is started, the delegated authentication session may be extended to one or more additional trusted user devices (e.g., additional smart home devices) that are co-located in the corresponding environment (e.g., a home environment of the user). The additional trusted user devices may be determined to be co-located through a combination of signals, such as “co-wake” data (e.g., smart home devices within listening distance of one another), Bluetooth Low Energy (BLE) beaconing, and/or user device network IDs. In some examples, a delegated authentication session may be extended across such additional trusted user devices by using weak authentication signals (e.g., voice ID and/or face ID on the additional trusted devices) by which the identity of the user is authenticated. These and other details will be described herein in greater detail with reference to the accompanying figures.

The natural language processing system configured to leverage the authentication delegation service described herein may provide number technological improvements over existing systems and technologies. For example, by delegating a user authentication request to a user device (e.g., a mobile device) in the user’s possession, the need to require high-confidence, profile-level strong authentication on every trusted user device (e.g., every smart home device in the user’s environment) is removed, thus reducing computational complexity and computer resource consumption on the part of the trusted user devices. Furthermore, conventional systems may not be configured to unlock enterprise access for a first user device (e.g., a smart home device) using a passkey stored on a second user device (e.g., a mobile device such as a smartphone), and the methods described herein achieve this by delegating user authentication requests between trusted endpoints (e.g., multiple trusted user devices). The use of passkeys by the authentication delegation service also ensures minimal friction in the user experience which only requires a simple and secure passkey-based authentication challenge. In this regard, the need for a user to recall passwords, usernames, and/or other login information is removed, thus reducing the opportunity for human error to occur during an authentication process.

The various techniques described herein may be used in a variety of contexts, including in natural language processing enabled devices (e.g., devices employing voice control and/or speech processing “voice assistants”) and/or systems. Examples of speech processing systems and/or voice-enabled personal assistants include the Siri system from Apple Inc. of Cupertino, California, voice-enabled actions invoked by the Google Assistant system from Google LLC of Mountain View, California, Dragon speech recognition software or the Cortana system from Microsoft of Redmond, Washington, the Alexa system from Amazon.com, Inc. of Seattle, Washington, etc.

Storage and/or use of data related to a particular person or device (e.g., device identifier data, device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the data accessed by various devices and/or data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

It will be appreciated that the scope of the present disclosure encompasses many potential examples in addition to those described above, some of which will be described in further detail below. Now that some advantages associated with example implementations described herein have been described above in contrast with traditional systems, examples of the architecture and componentry of various examples will now be described below with reference to FIGS. 1-7.

FIG. 1 illustrates an example architecture related to a natural language processing system 100 configured for device authentication delegation. In some examples, the natural language processing system 100 may be a cloud-based system and may comprise an authentication delegation service 102, a device posture assessment service 104, and a search index service 106. Also as shown, the authentication delegation service 102 may embody and/or integrate with authentication token storage component 108, cached enterprise data storage component 110, and/or session management component 111. Additionally, the authentication delegation service 102 may be configured to communicate with an enterprise service (e.g., enterprise service 112) and may be configured to communicate with, manage, and/or otherwise integrate with one or more devices 118A-118N associated with a user. In some examples, the enterprise service 112 may be a 3P enterprise service. In various examples, communication between the various components depicted in FIG. 1 may occur directly or across a network (e.g., a telecommunications network (e.g., a 5G network), wide area network (WAN), local area network (LAN), wireless Internet (Wi-Fi) network, and/or the like capable of facilitating remote network communications).

As described herein, the authentication delegation service 102 may be configured to enable read/write access to enterprise data managed by an enterprise service 112 for a first user device (e.g., device 118A such as a smart home device) by implementing an enhanced use of passkey technology on a second user device (e.g., device 118B such as a smartphone) in order to authenticate the first user device. As such, the authentication delegation service 102 may be configured to enable a user to access both personal data (e.g., family event data, shopping list data, personal calendar data) and enterprise data (e.g., external data related to the user's place of employment) simultaneously across multiple user devices (e.g., devices 118A-118N). In various examples, enterprise data may be sensitive data related to an organizational entity (e.g., a place of employment of the user) such as data related to the user's work calendar (e.g., client meeting schedules, internal meeting schedules, organizational events), work correspondence (e.g., correspondence related to the products, services, and/or operations of the organizational entity), co-workers (e.g., PII related to the staff and management of the organizational entity), and/or other private or sensitive data (e.g., data related to a work product).

In order to provide such access to enterprise data by one or more user devices (e.g., device 118A such as a smart home device), the authentication delegation service 102 may be configured to facilitate an enterprise service account linking process in which an enterprise service account (e.g., a 3P enterprise service account) associated with a user that is managed by the enterprise service 112 is linked to a user account that is managed by the natural language processing system 100. Specifically, the authentication delegation service 102 may be configured to enable to the user to authenticate an enterprise service account with the enterprise service 112 via a software application instance associated with the natural language processing system 100 using credentials associated with the enterprise service account (e.g., a user identifier (e.g., username, email address) and password). In some examples, an enterprise service account may be an account associated with a work calendar and/or work email associated with the enterprise service account that is managed by the enterprise service 112. Once the enterprise service account has been authenticated successfully by the enterprise service 112, the authentication delegation service 102 may be configured to receive or retrieve an authentication token from the enterprise service 112, where the authentication token may be associated with the enterprise service account and/or one or more enterprise resources related to the enterprise service account (e.g., calendar resources, email resources, enterprise contact information resources, enterprise data resources, enterprise service resources (e.g., 3P enterprise service resources), and/or the like).

The authentication token associated with the enterprise service account may then be utilized in future user interactions and/or application programming interface (API) calls configured to access enterprise data without requiring the user to authenticate (or reauthenticate) the enterprise service account with the enterprise service 112 using the credentials associated with the enterprise user account. This may be possible due to a user account linkage (e.g., a binding, mapping) generated by the authentication delegation service 102, where the user account linkage binds the authentication token related to the enterprise service account and a passkey associated with a user account is managed by the natural language processing system 100. In some examples, the user account that is managed by the natural language processing system 100 may be associated with a user profile comprising various data related to the corresponding user including user identification data (e.g., PII, user account credentials (e.g., usernames, passwords, PIN codes), user identifiers (e.g., voice profiles, facial profiles, biometric profiles)), user device data (e.g., user device identifiers), personal data associated with the user (e.g., image data, multimedia data, personal calendar/event data, data associated with one or more family members related to the user, search history data, shopping history data, preference data), financial data associated with the user (e.g., credit card information, linked bank account information, transaction history data), and/or the like.

The authentication delegation service 102 may be configured to facilitate the generation of a passkey associated with the user account that is managed by the natural language processing system 100 and a particular user device (e.g., device 118B such as a mobile device). As such, the authentication delegation service 102 may be configured to authenticate the user account (and, by extension, the identity of the user) based on a authentication response 126 received from a user device (e.g., device 118B) indicating the successful execution of a passkey-based authentication challenge on the user device (e.g., a biometric challenge (e.g., fingerprint), memorized secret challenge (e.g., passcode), facial recognition challenge, and/or the like), where the passkey-based authentication challenge may be associated with the passkey. Further detail related to the generation of the passkey and the generation of a user account linkage will be described herein with reference to FIG. 3.

In some examples, the authentication delegation service 102 may be configured to leverage a user recognition component associated with the natural language processing system 100 in order to identify a user and/or a user device (e.g., device 118B such as a mobile device) associated with the user. For example, the authentication delegation service 102 may receive input data 116 captured by a first user device (e.g., device 118A such as a smart home device) comprising a natural language request made by the user (e.g., audio data related to an utterance of the user). The authentication delegation service 102 may leverage the user recognition component to identify a voice profile associated with the user based on the natural language request made by the user. Once a voice profile has been identified, the authentication delegation service 102 may be configured to identify the corresponding user account. The authentication delegation service 102 may then identify a second user device (e.g., device 118B such as a mobile device) based on a device identifier comprised in the user account.

In the event a natural language request (e.g., an utterance) related to the input data 116 is associated with a request to access enterprise data managed by the enterprise service 112, the authentication delegation service 102 may provide an authentication notification 124 to the second user device (e.g., device 118B). In some examples, the authentication notification 124 may be an interactive notification configured to prompt and/or facilitate the execution of a passkey-based authentication challenge on the second user device (e.g., device 118B), where a successful user authentication based on the passkey-based authentication challenge is effective to activate a private cryptographic key associated with the passkey related to the user account to complete a passkey-based authentication. Upon a successful completion of the passkey-based authentication, the authentication delegation service 102 may enable the first user device (e.g., device 118A such as a smart home device) to access enterprise data managed by the enterprise service 112.

In this regard, the first user device (e.g., device 118A) may be authorized to initiate various API calls configured to access enterprise data (e.g., Microsoft Graph API calls), where the API calls comprise the authentication token associated with the enterprise service account that has been bound to the user account managed by the natural language processing system 100. In some examples, authorizing the first user device (e.g., device 118A such as a smart home device) to access the first enterprise data enables the first device to initiate one or more enterprise data creation actions, enterprise data reading actions, enterprise data updating actions, and/or enterprise data deletion actions. In such examples, a respective enterprise data creation action, enterprise data updating action, and/or enterprise data deletion action may be effective to update corresponding enterprise data in a data storage device managed by the enterprise service 112.

Additionally, in some examples, the authentication delegation service 102 may be configured to receive and/or retrieve updated enterprise data and/or new enterprise data from the enterprise service 112 and store the updated enterprise data and/or the new enterprise data (e.g., by leveraging one or more of the cached enterprise data storage component 110 and/or the search index service 106). In such examples, the authentication delegation service 102 may be configured to receive and/or retrieve updated enterprise data and/or new enterprise data according to a predetermined schedule (e.g., every half hour, every hour, every six hours, every night at a predefined time, and/or according to any other suitable schedule). Additionally or alternatively, the authentication delegation service 102 may be configured to receive and/or retrieve updated enterprise data and/or new enterprise data upon the completion of one or more enterprise data creation actions, enterprise data updating actions, and/or enterprise data deletion actions that are effective to update corresponding enterprise data in a data storage device managed by the enterprise service 112. Further detail related to these processes will be described herein with reference to FIG. 4.

In some examples, the authentication delegation service 102 may be configured to maintain device compliance for multiple trusted devices (e.g., one or more devices 118A-118N) using a combination of authentication signals from the multiple trusted devices. For example, upon successful completion of a passkey-based authentication challenge on a mobile device (e.g., device 118B) of the user (e.g., a biometric authentication, passcode authentication, facial recognition authentication, or the like), the user may access enterprise grade data managed by the enterprise service 112 across one or more devices 118A-118N (e.g., one or more co-located smart home devices) in the environment of the user during a secure delegated authentication session.

In this regard, the authentication delegation service 102 may be configured to leverage the device posture assessment service 104 to monitor the security status of one or more devices 118A-118N (e.g., smart home devices) of a respective user, passkeys associated with a user device (e.g., device 118A such as a mobile device) of the respective user, and/or authentication tokens (e.g., authentication tokens related to various enterprise resources of the enterprise service 112) to strongly authenticate the respective user and enable access to critical enterprise data from the one or more devices 118A-118N. In various examples, authentication of a first user device (device 118A, e.g., a smart home device) is delegated to a second user device (device 118B, e.g., a mobile device) associated with a passkey that has been configured via a software application instance (e.g., a mobile software application) associated with the natural language processing system 100 in order to provide strong out-of-band, multi-factor authentication.

Once the user account associated with the natural language processing system 100 is authenticated based on the passkey (and, by extension, the identity of the respective user has been verified), the session management component 111 may maintain a delegated authentication session for the one or more trusted devices (e.g., devices 118A-118N) that are co-located in a given environment and are associated with the same authenticated user account. In this regard, the session management component 111 may be configured to assign a session ID to a respective a delegated authentication session and monitor the duration of the delegated authentication session, as well as the activity of the one or more trusted devices which are associated with the respective delegated authentication session. Upon the expiration of the respective delegated authentication session, the session management component 111 may indicate to the authentication delegation service 102 that the one or more trusted devices (e.g., device 118A-118N) are no longer eligible to access enterprise data associated with the enterprise service account managed by the enterprise service 112.

As described herein, the authentication delegation service 102 may be configured to leverage the device posture assessment service 104 to ensure that a first user device (e.g., device 118A such as a smart home device) and/or an affiliated software application instance that is requesting enterprise data adheres to a minimum set of security requirements set forth by the enterprise service 112 responsible for managing said enterprise data. A respective device posture assessment (e.g., a security status assessment) evaluates a current state or "posture" of a user device (e.g., device 118A) to determine a level of security of the user device before allowing the user device to access network resources of the enterprise service 112. The device posture assessment checks for compliance with one or more predefined security policies (aka conditional access policies) related to various aspects of a user device (e.g., device 118A) such as whether the user device is using an up-to-date operating system (OS) version and/or minimum software/firmware patch levels, whether the user device is "jailbroken" or has root access, and/or whether the user device comprises required security software and/or security certificates. The goal of a device posture assessment is to minimize the risk of compromised user devices accessing sensitive enterprise resources related to the enterprise service 112. In some examples and for various types of user devices, a respective device posture assessment may ensure that a minimum OS version is installed, minimum user authentication mechanisms are enabled (e.g., biometric authentication mechanisms, facial recognition mechanisms, passcode mechanisms), a device passcode with a minimum complexity is set (e.g., a passcode having six digits, or any other suitable number of digits), and/or the like. Such conditional access policies ensure that a respective user device (e.g., device 118A) is secure enough to handle various types of sensitive enterprise data.

In this regard, a software application instance associated with the natural language processing system 100 that is running on the first user device (e.g., device 118A such as a smart home device) may configure an abuse detection endpoint protection (ADEP) agent 120 running on the OS of the first user device to generate various device compliance signals 122A-122N. Such device compliance signals 122A-122N may be used to assert the first device's compliance with various predetermined conditional access policies. In some such examples, the ADEP agent 120 of a respective user device (e.g., device 118A) may be configured to generate and/or transmit various device compliance signals 122A-122N to the device posture assessment service 104 according to a predetermined interval (e.g., every minute, every half hour, every hour, or any other suitable interval). Additionally or alternatively, the authentication delegation service 102 may cause the device posture assessment service 104 to request one or more device compliance signals 122A-122N from the ADEP agent 120 of the user device (e.g., device 118A) in response to receiving input data 116 (e.g., an utterance) associated with a request for enterprise data from the enterprise service 112.

In some examples, the device compliance signals 122A-122N may comprise data related to the status and/or configuration of a respective user device (e.g., device 118A). For example, the device posture assessment service 104 may process one or more device compliance signals 122A-122N to determine whether the software application instance associated with the user device (e.g., device 118A) has been validated by the natural language processing system 100, whether the latest security updates have been installed on the user device, whether a bootloader associated with the user device has been locked, whether the hardware of the user device is authentic (e.g., based on a device hardware authentication (DHA) certificate), whether the user device comprises an anti-rollback feature, whether developer tools have been properly disabled (e.g., command-line tools such as Android debug bridge (ADB)), whether the user device is configured to receive over-the-air (OTA) updates, whether any side-loaded applications are present on the user device, whether any known malware is present on the user device, whether the user device has been jailbroken or given root access, whether the device has been unlocked by the natural language processing system 100, the current firmware and/or patch level of the user device, various access control permissions, and/or whether the file system of the user device has passed an integrity check (e.g., device-mapper-verity check).

In some examples, the authentication delegation service 102 may leverage the device posture assessment service 104 to assess the device posture (e.g., the security status) of respective user devices (e.g., devices 118A-118N) based on such device compliance signals 122A-122N. In this manner, the authentication delegation service 102 may ensure that any user device (e.g., device 118A) requesting access to enterprise data managed by a respective enterprise service 112 passes a device posture assessment associated with various conditional access policies required by the respective enterprise service 112. As such, the authentication delegation service 102 may enforce various conditional access policies which may determine whether a first user device (e.g., device 118A) is allowed to access a respective enterprise service 112 based on specific criteria such as device security status (e.g., as indicated by various device compliance signals 122A-122N), user identity, and/or network location (e.g., whether the user device is connected to known and/or trusted network).

Once the authentication delegation service 102 (in conjunction with the device posture assessment service 104) has successfully asserted that the first user device (e.g., device 118A) satisfies the various conditional access policies and the user account has been authenticated via a passkey-based user authentication (executed via a second user device, e.g., device 118B), the first user device may securely access various resources and/or enterprise data associated with the enterprise service 112. Additionally, in some examples, the device posture assessment service 104 may be configured to monitor the device compliance and/or a security status of one or more user devices and remotely manage the one or more user devices if necessary. This may include actions such as remotely wiping a compromised, lost, or stolen user device (e.g., device 118A) and/or pushing various software updates (e.g., security updates, updates related to the software application instance associated with the natural language processing system 100, and/or the like).

As illustrated in FIG. 1, the authentication delegation service 102 may comprise and/or integrate with one or more storage components such as the authentication token storage component 108, the cached enterprise data storage component 110, and/or the search index service 106. In some examples, the authentication token storage component 108 may be configured to manage various authentication tokens (e.g., authentication tokens related to various enterprise resources and/or enterprise service accounts of one or more respective users), public cryptographic keys (e.g., public cryptographic keys associated with a passkey related to respective user devices and/or user accounts of one or more respective users), data related to one or more user account linkages (e.g., linkages between user accounts managed by the natural language processing system 100 and authentication tokens associated with respective enterprise service accounts), and/or the like associated with one or more users of the natural language processing system 100. In some examples, the authentication token storage component 108 may be configured to store a universal unique identifier (UUID) associated with a respective authentication token, where the UUID associated with the respective authentication token is used by the authentication delegation service 102 to reference the corresponding authentication token that is stored in separate storage device (e.g., a separate secure, cloud-based storage device associated with the natural language processing system 100).

The cached enterprise data storage component 110 may be configured to store various data related to enterprise data that has been accessed by the authentication delegation service 102 based on input data 116 received from a user device (e.g., device 118A). For example, enterprise data related to a work calendar associated with an enterprise service account (e.g., client meeting schedules, internal meeting schedules, organizational events) that has been accessed by an authorized user device (e.g., device 118A) may be stored in the cached enterprise data storage component 110. In some examples, the cached enterprise data storage component 110 may store various enterprise data for a predetermined amount of time (e.g., one month, two months, or any suitable amount of time). Additionally or alternatively, the cached enterprise data storage component 110 may store enterprise data associated with a predetermined time range (e.g., calendar event data associated with a predetermined time range). An example predetermined time range may be a time range of thirty days prior to a current date to ninety days beyond the current date (or any other suitable time range). As such, in some examples, when a respective user device (e.g., device 118A) has been authorized to access enterprise data associated with a work calendar and/or work email related to an enterprise service account that is managed by the enterprise service 112, any work calendar data and/or work email data that corresponds to the predetermined time range (e.g., work events occurring any time in the next ninety days from a current date or that have already occurred in the past thirty days) may be stored in the cached enterprise data storage component 110.

In various examples, the natural language processing system 100 may be configured to leverage a software application instance to cause display of various personal data and enterprise data simultaneously on the electronic display of a respective user device (e.g., device 118A) that has been authorized to access said enterprise data. For example, turning briefly to FIG. 2, the software application instance associated with the natural language processing system 100 may be configured to render a user interface displaying an interactive calendar 200 depicting personal data and enterprise data simultaneously on the electronic display of a user device (e.g., device 118A). In some such examples, it may be desirable to obscure various portions of the enterprise data that is being displayed by the user device (e.g., device 118A) so that unintended users cannot view the enterprise data. As such, the authentication delegation service 102 may be configured to generate obscured enterprise data based on various enterprise data stored in the cached enterprise data storage component 110. For example, the software application instance associated with the natural language processing system 100 may indicate that the user has a work event in addition to a family event on a given day. As shown in FIG. 2., the interactive user interface element 202 may be used to indicate the obscured enterprise data related to the work event, whereas the interactive user interface element 204 may be used to indicate unobscured personal data related to the user.

In such an example, the enterprise data related to the work event stored in the cached enterprise data storage component 110 may indicate that the work event is entitled "Bob Manager's Retirement Party" and takes place from 2:00-2:30 PM ET in Board Room 3 on Floor 10 on the given day (e.g., Oct. 6, 2025). The enterprise data may also comprise identifying data related to the expected attendees of the work event. However, rather than indicating the title of the work event, the location of the event, and/or displaying the names of the expected attendees, the natural language processing system 100 may cause the rendering of obscured enterprise data associated with the work event that obfuscates the name/title of the event and/or various other portions of relevant data related to the work event (e.g., PII related to the expected attendees of the work event). For example, the natural language processing system 100 may cause display of obscured work event data (e.g., via interactive user interface element 202) with a title such as "Work Event 2 PM" or "Work Meeting 2 PM" rather than "Bob Manager's Retirement Party" while simultaneously displaying unobscured personal data such as the title of the family event (e.g., "Misty's Soccer Game 5:30 PM" as depicted by interactive user interface element 204).

In some examples, an interactive user interface element associated with obscured enterprise data (e.g., interactive user interface element 202) may be interactive such that a user may select interactive user interface element to initiate various actions. For example, based on input data 116 indicating a selection indication associated with the interactive user interface element 202, the authentication delegation service 102 may authenticate (or reauthenticate) the user account so the user may access (e.g., view, update, delete, or the like) the enterprise data associated with the obscured enterprise data. As such, the authentication delegation service 102 may leverage the session management component 111 to determine a delegated authentication session status related to the first user device (e.g., device 118A), where the delegated authentication session status indicates whether a delegated authentication session is currently active for the first user device.

Upon a determination that a delegated authentication session is not currently active for the first user device (e.g., device 118A), the authentication delegation service 102 may provide an authentication notification 124 to a second user device (e.g., device 118B), where the authentication notification 124 comprises a passkey challenge object. The authentication delegation service 102 may be configured to authenticate a first account registered with the natural language processing system 100 based on an authentication response 126 received from the second user device (e.g., device 118B). In some examples, the authentication response 126 may comprise a passkey challenge signature associated with the passkey challenge object, where the second passkey challenge signature indicates an execution of a passkey-based authentication challenge on the second user device. Additionally, the authentication response 126 may comprise a device signature (e.g., device-specific information related to one or more of a device serial number, device type, and/or other device identifier) that is unique to the second user device (e.g., device 118B). Alternatively, upon a determination that a delegated authentication session is currently active for the first user device (e.g., device 118A), the authentication delegation service 102 may determine not to re-authenticate the user account.

Once the user account is successfully authenticated and/or it is determined that a valid delegated authentication session is active, the authentication delegation service 102 may provide the enterprise data associated with the obscured enterprise data to the first user device (e.g., device 118A), such as the title of the work event (e.g., "Bob Manager's Retirement Party"), the location of the work event (e.g., Board Room 3 on Floor 10), and/or various identifying data related to the expected attendees of the work event. Furthermore, in some examples, if a delegated authentication session is currently active for one or more user devices (e.g., device 118A and device 118C), the authentication delegation service 102 may be configured to cause the display of enterprise data that is not obscured on the one or more user devices. For example, the user may be enabled to view unobscured enterprise data alongside personal data on an interactive calendar (e.g., interactive calendar 200) rendered on a user interface associated with a software application instance of the natural language processing system 100 during the predetermined duration of the active delegated authentication session. In such examples, once the duration of the active delegated authentication session has expired, the authentication delegation service 102 may be configured to obscure any enterprise data that may be visible via the interactive calendar (e.g., interactive calendar 200) rendered on a user interface associated with a software application instance of the natural language processing system 100.

Additionally or alternatively, in some examples, the natural language processing system 100 may be configured to provide enterprise data (or obscured enterprise data) to a user device (e.g., device 118A) in an audio format. For example, in response to input data 116 comprising an utterance such as "What is on my agenda today?", the natural language processing system 100 may generate audio data to be output by the user device (e.g., device 118B) related to any obscured enterprise data related to the current day such as, "At 2:00 PM, you have a meeting on your work calendar." Alternatively, if the authentication delegation service 102 determines that a delegated authentication session is currently active (e.g., based on signals received from the session management component 111), the natural language processing system 100 may generate audio data to be output by the user device (e.g., device 118B) related to the sensitive details of the enterprise data such as "At 2:00 PM, you have Bob Manager's Retirement Party in Board Room 3."

Further in this regard, the natural language processing system 100 may be configured to generate various enterprise data alerts and/or notifications to be provided to one or more user devices (e.g., device 118A such as a smart home device or device 118B such as a mobile device). In some such examples, the various enterprise data alerts and/or notifications may be provided according to a predetermined schedule (e.g., a user-defined schedule) such as every weekday morning at 6:30 AM (or any other suitable predetermined schedule). In various examples, a respective enterprise data alert may be configured in a respective format including an audio format (e.g., an automated message associated with various enterprise data to be played via a device 118A), a visual format (e.g., enterprise data in a textual and/or graphical format to be rendered via an electronic display of a device 118A), and/or a message format (e.g., enterprise data comprised in an SMS message, email, and/or the like and provided to a device 118A and/or a device 118B). In some such examples, one or more enterprise data alerts may be provided via the software application instance associated with the natural language processing system 100. Additionally, one or more enterprise data alerts may comprise obscured enterprise data such that a respective enterprise alert does not convey sensitive information related to the enterprise data (e.g., event titles, event locations, event attendee information (e.g., PII), and/or the like) and a genericized summary of the enterprise data may be presented (e.g., "You have an on-site work meeting at 2:00 PM this afternoon").

Turning back to FIG. 1, in some examples, the authentication delegation service 102 may be configured to leverage the search index service 106 to optimize the speed and efficiency of responding to various user queries related to enterprise data. In this regard, the search index service 106 may be configured to tokenize and/or index various enterprise data comprised in the cached enterprise data storage component 110. In some examples, the search index service 106 may manage one or more search indexes associated with the natural language processing system 100, where the one or more search indexes may be configured as deep semantic indexes comprising enterprise data related to one or more users. A respective search index may be an index comprising embeddings (e.g., a collection of vectors associated with tokenized data configured to capture semantic relationships in the tokenized data) associated with various enterprise data. In this regard, the search index service 106 may be configured to tokenize, index, and/or semantically represent various enterprise data by respective embeddings (e.g., multidimensional numerical representations that convey the meaning, intent, and/or context of the various enterprise data).

In various examples, the authentication delegation service 102 may be configured to determine whether to leverage the search index service 106 to query a respective search index to provide enterprise data to a user device (e.g., device 118A such as a smart home device) or to retrieve said enterprise data from the enterprise service 112. As such, the authentication delegation service 102 may leverage an orchestrator (e.g., an LLM orchestrator) associated with the natural language processing system 100 to determine an access intent associated with input data 116 (e.g., a natural language request to access enterprise data). In some such examples, an access intent may indicate whether input data 116 comprises a request to create enterprise data, read enterprise data, update enterprise data, and/or delete enterprise data.

If the input data 116 is not associated with a request to create, update, or delete enterprise data and is associated with a request to read (e.g., view) enterprise data, the authentication delegation service 102 may leverage the search index service 106 to query a respective search index based on the input data 116. In such an example, the search index service 106 may perform a semantic search in the respective search index to identify and/or retrieve the enterprise data (e.g., a tokenized representation of the enterprise data) indicated by the input data 116. Additionally or alternatively, in some such examples, the search index service 106 may be configured to initiate and/or execute one or more API calls configured to perform the semantic search in the respective search index based on the input data 116. Accordingly, the authentication delegation service 102 may be configured to decode and/or send the enterprise data retrieved by the search index service 106 from the respective search index to the user device that requested the enterprise data (e.g., device 118A such as a smart home device).

As described herein, in some examples, a user may interact with the natural language processing system 100 via a software application instance, where the software application instance may be configured to facilitate one or more of the various device authentication processes, enterprise service account linking processes, enterprise data access processes, and/or the like as described herein. In various examples, a respective software application instance associated with the natural language processing system 100 may be installed and/or downloaded to a user device (e.g., device 118B such as a mobile device, device 118A such a smart home device) and may present one or more user interface configurations to a respective user. As such, the software application instance associated with the natural language processing system 100 may be configured to guide a user through one or more of the various operations described herein.

For example, the software application instance associated with the natural language processing system 100 may be configured to cause display of various interactive user interface elements to the user to facilitate the submission of various input data 116. In various examples, the interactive user interface elements may be configured as one or more interactive text fields, buttons, selectable images, hyperlinks, radio buttons, sliders, embedded multimedia modules, maps, charts, graphs, prompts, notifications, banners, instructions, and/or the like configured to initiate execution of one or more commands (e.g., executable software instructions) designed to facilitate the capture of one or more portions of user input. In this regard, a user may be enabled to interact with the natural language processing system 100 via a number of technological platforms and in various ways. For example, the user may interact with the authentication delegation service 102 via a smart home device, a software application instance running on a user device (e.g., a smartphone, laptop), a web browser extension (e.g., a plugin, auxiliary software application embedded in the web browser), an embedded computing device (e.g., a central computing device in an automobile), and/or the like.

As such, the user may be enabled to interact with the authentication delegation service 102 in a number of ways including conversational speech (e.g., a natural language request), text-based communication (e.g., direct text input), a user selection indication (e.g., an interaction with a user interface), and/or via various body gestures. In this regard, one or more of the devices 118A-118N may be a known computing device in the art such as a smartphone, laptop, tablet computer, smart home device (e.g., virtual assistant device), a home automation system device, Internet of Things (IoT) device (e.g., network-capable appliance), and/or the like. Additionally, in various examples, the software application instance associated with the natural language processing system 100 may be configured to enable a user to access a software application framework related to a respective enterprise (e.g., a 3P enterprise) by, for example, granting (e.g., transmitting, enabling, toggling, configuring, etc.) one or more access permissions to a user device (e.g., device 118A) associated with the user, where the one or more access permissions enable the user device to access a software application framework associated with an enterprise service 112 of the respective enterprise.

In various examples, a user device (e.g., device 118A) may be a natural language processing enabled device and may include a "wakeword" detection component. The wakeword detection component may process audio data captured by microphones of a speech processing enabled device and may determine whether or not a keyword and/or phrase, which are collectively sometimes referred to herein as a wakeword, is detected in the audio data. In some examples, when a wakeword is detected, the speech processing enabled device may enter a "sending mode," "audio capturing mode," and/or other type of processing mode in which audio detected by the microphones following the wakeword (e.g., input data 116 representing a user query or command spoken after the wakeword) may be sent to natural language processing computing component(s) (either locally or remotely) for further natural language processing (e.g., ASR, natural language understanding (NLU), LM inference, etc.). In various examples, the wakeword detection component may be used to distinguish between audio that is intended for the natural language processing system 100 and audio that is not intended for the natural language processing system 100. In some examples, detection of a wakeword by the wakeword detection component may cause the user device (e.g., device 118A) to transmit a signal to the natural language processing system 100 to initiate one or more of a creation, reading, updating, and/or deletion (CRUD) operation related to enterprise data managed by the enterprise service 112 based on various input data 116.

In various examples, input data 116 may be captured by one or more components of a respective user device (e.g., device 118A) such a microphone, touchscreen, camera (e.g., front-facing camera, rear-facing camera), and/or one or more sensors. In some examples, input data 116 may be audio data (e.g., utterances, natural language requests, human speech) associated with a user query (e.g., a request, command, instruction) for which a user expects various enterprise data and/or personal data in response. Additionally or alternatively, input data 116 may be text data and/or selection data (e.g., user interface interaction data) associated with a respective user query. In some such examples, a user query may serve as an input into an orchestrator (e.g., an LLM orchestrator) associated with the natural language processing system 100 and may be a request to perform some task. The specific task may vary and, in some examples, may be related to one or more portions of enterprise data managed by the enterprise service 112.

In this regard, FIG. 1 depicts an example data flow related to an example interaction with some of the components of the natural language processing system 100 as described herein. At step 1, the authentication delegation service 102 may receive input data 116 from a first user device (e.g., device 118A such as a smart home device). For example, the input data 116 may be associated with a natural language request (e.g., an utterance) such as "Move my lunch with Alice on Tuesday to 2:30 PM." In some examples, the authentication delegation service 102 may leverage an LLM orchestrator associated with the natural language processing system 100 to determine a context and/or access intent associated with the input data 116. For instance, the authentication delegation service 102 may determine that the natural language request associated with the input data 116 is not a request to update personal data (e.g., a calendar event related to a first account, e.g., a personal account, registered by the natural language processing system 100), but is a request to update enterprise data (e.g., a work calendar event related to an enterprise service account).

As such, at step 2, the authentication delegation service 102 may be configured to assert a security status of the first user device (e.g., device 118A such as a smart home device) to the device posture assessment service 104. As described herein, the device posture assessment service 104 may be configured to determine a security status of the first user device based on one or more device compliance signals 122A-122N transmitted by the first user device.

At step 3, the device posture assessment service 104 may be configured to send an acknowledgement (e.g., a signal, electronically managed data object) to the authentication delegation service 102 that indicates whether the first user device (e.g., device 118A) is compliant with one or more predetermined conditional access policies. If the device posture assessment service 104 determines the first user device (e.g., device 118A) is compliant with one or more predetermined conditional access policies, the authentication delegation service 102 may proceed to step 4.

At step 4, the authentication delegation service 102 may employ a user recognition component of the natural language processing system 100 to identify a voice profile based on the natural language request of the input data 116, determine a first account based on the voice profile, and determine a second user device (e.g., device 118B such as mobile device) based on a device identifier associated with the first account. Once the second user device (e.g., device 118B) has been identified, the authentication delegation service 102 may be configured to send an interactive authentication notification 124 comprising a passkey challenge object to the second device.

At step 5, the authentication delegation service 102 may be configured to receive an authentication response 126 from the second user device (e.g., device 118B). The authentication delegation service 102 may be configured to authenticate the first account associated with the second device based on the authentication response 126 received from the second user device (e.g., device 118B). The authentication response 126 may comprise a passkey challenge signature associated with the passkey challenge object, and the second passkey challenge signature may indicate a successful execution of a passkey-based authentication challenge on the second user device (e.g., a biometric challenge (e.g., fingerprint), a memorized secret challenge (e.g., a passcode), a facial recognition challenge, and/or the like). Additionally, the authentication response 126 may comprise a device signature (e.g., device-specific information related to one or more of a device serial number, device type, and/or other device identifier) that is unique to the second user device (e.g., device 118B). In such examples, the device signature of the second user device (e.g., device 118B) may be associated with the respective passkey associated with the first account. The authentication delegation service 102 may utilize the device signature to verify that the second user device (e.g., device 118B) is the user device that originally enrolled in the passkey associated with the first account such that no other user devices may be allowed to utilize the private cryptographic key of the respective passkey to authenticate the first account, even if the passkey remains valid across other user devices.

At step 6, and upon successful authentication of the first account that is associated with the second device (e.g., device 118B) and registered with the natural language processing system 100, the authentication delegation service 102 may be configured to execute one or more actions associated with the natural language request related to the input data 116. For example, based on the natural language request (e.g., an utterance) "Move my lunch with Alice on Tuesday to 2:30 PM," the authentication delegation service 102 may execute one or more API calls to the enterprise service 112. The one or more API calls may be associated with an enterprise data update action configured to update one or more portions of enterprise data related to the lunch meeting indicated by the natural language request. In this regard, the authentication delegation service 102 may be configured to access a user account linkage that binds an authentication token related to an enterprise service account managed by the enterprise service 112 and the passkey associated with the first user account managed by the natural language processing system 100. The authentication token may be utilized in the one or more API calls made to the enterprise service 112 in order to update the relevant enterprise data associated with the lunch meeting indicated by the natural language request.

At step 7, the first device (e.g., device 118A) may receive enterprise data from the enterprise service 112. In some such examples, the enterprise data may first be received by the natural language processing system 100 which may be configured to send the enterprise data to the first device (e.g., device 118A). By way of continued example, upon successful update of the enterprise data corresponding to the natural language request "Move my lunch with Alice on Tuesday to 2:30 PM," the authentication delegation service 102 may retrieve or receive the updated enterprise data from the enterprise service 112. Additionally, in such examples, the authentication delegation service may cause the update of one or more relevant portions of data managed by the cached enterprise data storage component 110 based on the updated enterprise data received from the enterprise service 112. Alternatively, in some examples, the first device (e.g., device 118A) may be configured to receive the updated enterprise data from the enterprise service 112 directly. Further details related to the steps of the above example data flow will be described herein with reference to FIGS. 3-8.

FIG. 3 illustrates a flowchart 300 showing example operations of an example enterprise service account linking process. In various examples, the operations of the process illustrated by flowchart 300 may be facilitated and/or executed in whole or in part by one or more devices and/or systems. The actions of the process illustrated by flowchart 300 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process illustrated by flowchart 300 may be described above with reference to elements of FIGS. 1-2 and/or below with reference to FIGS. 3-8. Although shown in a particular order, the steps of the process shown in flowchart 300 may instead be performed in a different order. Additionally, various steps may be performed in parallel in various implementations. Further, some steps may be omitted and/or other steps may be added in accordance with the device authentication delegation techniques described herein.

In some examples, one or more operations of the example enterprise service account linking process depicted in the flowchart 300 may be executed subsequent to an initial log in event associated with a user account associated with the natural language processing system 100. For example, a user device (e.g., device 118B such as a mobile device) may have been used to log in (e.g., authenticate) to the user account using an authentication method other than a passkey-based authentication, such as by using credentials associated with the user account (e.g., a username and password), a PIN, or a one-time passcode (OTP). In other examples, one or more operations of the example enterprise service account linking process depicted in the flowchart 300 may be executed without a user device (e.g., device 118B) executing an initial log in event associated with a user account associated with the natural language processing system 100.

In some examples, the processing may begin at operation 302, at which the authentication delegation service 102 may be configured to receive an enterprise service account linking request. In some examples, the enterprise service account linking request may be received from a first user device (e.g., device 118A such as a smart home device). In various other examples, the enterprise service account linking request may be received from a second user device (e.g., device 118B such as a mobile device). An enterprise service account linking request may be a request to link a first account associated with the natural language processing system 100 to an enterprise service account managed by an enterprise service (e.g., enterprise service 112). In some examples, the authentication delegation service 102 may receive the enterprise service account linking request based on an interaction with a software application instance associated with the natural language processing system 100. Additionally or alternatively, the authentication delegation service 102 may receive the enterprise service account linking request based on a natural language request (e.g., an utterance) associated with input data 116, where the natural language request is a request to access first enterprise data and/or enterprise resources (e.g., enterprise data associated with a work calendar or work email related to an enterprise service account) managed by the enterprise service 112. In such examples, the authentication delegation service 102 may receive the enterprise service account linking request prior to authorizing the first device to access the first enterprise data.

The processing may continue at operation 304, at which the authentication delegation service 102 may be configured to receive an authentication token associated with the enterprise service account from the enterprise service (e.g., enterprise service 112). As described herein, the authentication delegation service 102 may be configured to leverage the software application instance associated with the natural language processing system 100 to authenticate the enterprise service account with the enterprise service (e.g., enterprise service 112). For example, the software application instance may comprise and/or be configured leverage a web browser configured to communicate with a website, domain, server, endpoint, and/or software application framework associated with the enterprise service (e.g., enterprise service 112). In some examples, the authentication delegation service 102 may be configured to support extensible single sign-on (ESSO) operations, and/or support executable code related to an identity provider (IdP) associated with the enterprise service 112. In some such examples, various credentials associated with the enterprise service account (e.g., a user identifier (e.g., username, email address) and password) may be used to authenticate the enterprise service account with the enterprise service.

As such, the authentication delegation dervice1 102 may receive an authentication token associated with the enterprise service account from the enterprise service (e.g., enterprise service 112 in response to a successful authentication of the enterprise service account. As described herein, the authentication token may be associated with the enterprise service account and/or one or more enterprise resources related to the enterprise service account (e.g., calendar resources, email resources, enterprise contact information resources, enterprise data resources, enterprise service resources (e.g., 3P enterprise service resources), and/or the like).

In some examples, the authentication token may be a refreshable authentication token associated with the enterprise service account that may be configured never to expire. A refreshable authentication token may enable the authentication delegation service 102 to fetch new authentication tokens from the enterprise service 112 repeatedly as older authentication tokens expire. The authentication delegation service 102 may leverage the authentication token storage component 108 to store the refreshable authentications tokens in memory. In some examples, the authentication delegation service 102 may utilize a refreshable authentication token periodically (e.g., according to a predetermined schedule) to fetch enterprise data from the enterprise service 112 to update enterprise data stored by the cached enterprise data storage component 110 and/or the search index service 106. Additionally or alternatively, in some examples, the authentication delegation service 102 may be configured to utilize refreshable authentication tokens only during an active delegated authentication session. The essential advantage of refreshable authentication tokens over short-lived authentication tokens is that the refreshable authentication tokens eliminate the user experience friction in which a respective user may have to authenticate an enterprise service account repeatedly with the enterprise service 112 in order to keep enterprise data managed by the natural language processing system 100 updated.

In some examples, the authentication delegation service 102 may be configured to receive the authentication token upon a successful authentication of the enterprise service account by the enterprise service (e.g., enterprise service 112). In this regard, the authentication delegation service 102 may be configured to leverage the software application instance associated with the natural language processing system 100 to authenticate the enterprise service account with the enterprise service (e.g., enterprise service 112). For example, the software application instance may comprise and/or be configured leverage a web browser configured to communicate with a website, domain, server, endpoint, and/or software application framework associated with the enterprise service (e.g., enterprise service 112). In some such examples, various credentials associated with the enterprise service account (e.g., a user identifier (e.g., username, email address) and password) may be used to authenticate the enterprise service account with the enterprise service. In some examples, the authentication token may be stored by the authentication token storage component 108.

The processing may continue at operation 306, at which the authentication delegation service 102 may be configured to generate a passkey related to the first account associated with the natural language processing system 100. As described herein, passkey may comprise a public-private cryptographic key pair and may correspond to the first account and the second user device (e.g., device 118B such as a mobile device). Additionally, in some examples, the passkey may be associated with a particular type of passkey-based authentication challenge such as a biometric challenge (e.g., fingerprint), a memorized secret challenge (e.g., a passcode), a facial recognition challenge, and/or the like. In some examples, the software application instance associated with natural language processing system 100 may be configured to invoke program code (e.g., executable program instructions) that is native to the second user device (e.g., device 118B) in order to facilitate the generation of the passkey. In this regard, the software application instance associated with natural language processing system 100 may be configured to cause a passkey manager associated with the second user device (e.g., device 118B) to generate the passkey and/or assign a particular type of passkey-authentication challenge to the passkey.

Additionally, in some examples, a device signature associated with the second device (e.g., device 118A) may be associated (e.g., appended, stored) with the passkey. For example, a device signature (e.g., device-specific information related to one or more of a device serial number, device type, and/or other device identifier) that is unique to the second device may be associated with the passkey related to the first account and the second device. As such, passkey usage may be restricted to the user device originally used for enrollment in the passkey associated with the first account (e.g., the second device, device 118B). In such examples, the device signature may be linked to the public cryptographic key associated with the passkey that is stored by the authentication token storage component 108. In this regard, the authentication delegation service 102 may be configured to ensure that only the second device (e.g., device 118B) is allowed to authenticate the first account via the passkey even in the event that the private cryptographic key of the passkey has been synced to one or more additional user devices (e.g., synced via a cloud service associated with the second device and/or the one or more additional user devices, such as a keychain service). As a result, a passkey-based user authentication from a different device will fail due to the difference in device-specific information (e.g., indicated by the device signature) between the original device (e.g., the second device, device 118B) and a different user device attempting to use the passkey, even though the passkey may remain valid. In such examples, the device signature associated with the second device (e.g., device 118B) may be included in an authentication response (e.g., authentication response 126) for verification by the authentication delegation service 102 during a passkey-based authentication.

The processing may continue at operation 308, at which the authentication delegation service 102 may be configured to store a public cryptographic key of the public-private cryptographic key pair related to the passkey with relation to the first account. For example, as described herein, the authentication delegation service 102 may be configured to store the public cryptographic key related to the passkey in the authentication token storage component 108. In some examples, a private cryptographic key of the public-private cryptographic key pair related to the passkey is stored by the second user device (e.g., device 118B).

The processing may continue at operation 310, at which the authentication delegation service 102 may be configured to link the authentication token associated with the enterprise service account to the first account associated with the natural language processing system 100 to generate a user account linkage. Accordingly, the user account linkage may be accessed by the authentication delegation service 102 subsequent to a successful passkey-based user authentication on the second device (e.g., device 118B such as a smart phone) such that the authentication token may be used in various enterprise data operations (e.g., API calls) initiated by the first user device (e.g., device 118A such as a smart home device) that are configured to access enterprise data managed by the enterprise service (e.g., enterprise service 112).

Figure 4:
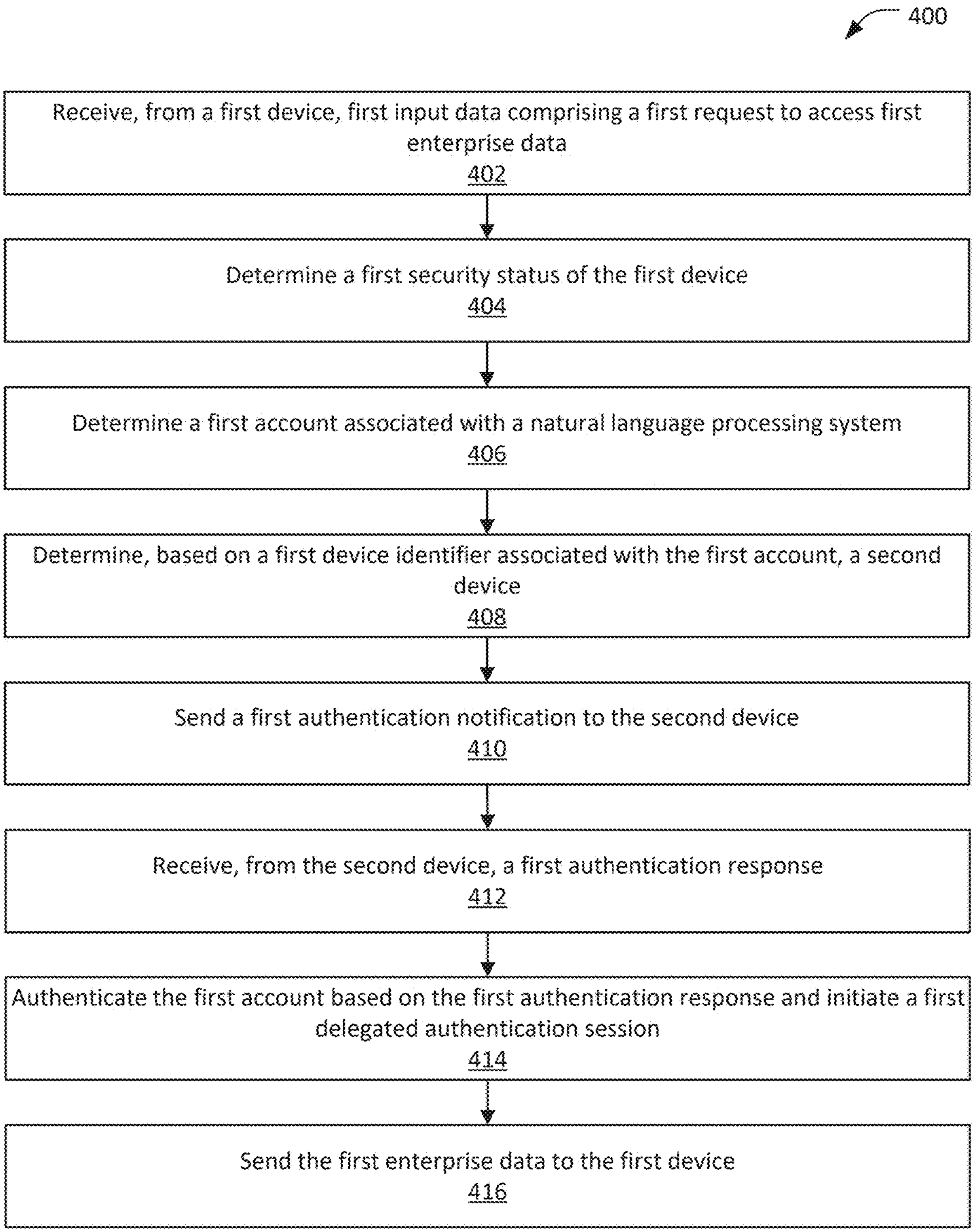
FIG. 4 illustrates a flowchart diagram of an example device authentication delegation process in accordance with various aspects of the present disclosure.

FIG. 4 illustrates a flowchart 400 showing example operations of an example device authentication delegation process. In various examples, the operations of the process illustrated by flowchart 400 may be facilitated and/or executed in whole or in part by one or more devices and/or systems. The actions of the process illustrated by flowchart 400 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process illustrated by flowchart 400 may be described above with reference to elements of FIGS. 1-3 and/or below with reference to FIGS. 5-8. Although shown in a particular order, the steps of the process shown in flowchart 400 may instead be performed in a different order. Additionally, various steps may be performed in parallel in various implementations. Further, some steps may be omitted and/or other steps may be added in accordance with the device authentication delegation techniques described herein.

The processing may begin at operation 402, at which the authentication delegation service 102 may be configured to receive, from a first user device (e.g., device 118A such as a smart home device), first input data (e.g., input data 116) comprising a first request, where the first request is a request to access first enterprise data managed by an enterprise service (e.g., enterprise service 112). In some examples, the first request may be a first natural language request (e.g., an utterance) to access the first enterprise data managed by the enterprise service (e.g., enterprise service 112). Alternatively, in some examples, the first request may be indicated based on an interaction with a user interface associated with a software application instance associated with the natural language processing system 100. For examples, as described herein, input data 116 associated with a request to access enterprise data may be associated with an interaction with one or more interactive user interface elements (e.g., interactive user interface element 202 described herein with reference to FIG. 2).

The processing may continue at operation 404, at which the device posture assessment service 104 may be configured to determine a first security status of the first user device (e.g., device 118A). As described herein, the first security status indicates that the first device complies with one or more predetermined conditional access policies and may be determined based on a first set of device compliance signals 122A-122N received from the first device (e.g., device 118A). In some examples, the one or more predetermined conditional access policies may be associated with one or more security standards set forth by a respective enterprise service (e.g., enterprise service 112).

The processing may continue at operation 406, at which the authentication delegation service 102 may determine a first account associated with a natural language processing system 100. In some examples, the first account may be determine based on execution of a first authentication mechanism having a first confidence rating. As described herein, the authentication delegation service 102 may attempt to identify a respective user account (e.g., the first account) using weak authentication signals (e.g., signals associated with authentication mechanisms having a first confidence rating (e.g., a false accept rate (FAR) of <5%)), such as voice ID and/or facial recognition.

For example, the request to access the first enterprise data may a natural language request (e.g., an utterance) associated with the input data 116. In such examples, a recognition component associated with the natural language processing system 100 may be configured to determine, based on the first natural language request (e.g., an utterance), a first voice profile (e.g., a voice profile associated with a particular user). For example, the user recognition component may perform user recognition by comparing audio characteristics in an utterance related to the input data 116 to stored audio characteristics of one or more users (e.g., voice profile data associated with one or more user accounts managed by the natural language processing system 100). In such an example, the voice profile may be associated with the first account associated with the natural language processing system 100 such that the authentication delegation service 102 may be configure to identity the first account based on the voice profile.

As another example, the authentication delegation service 102 may be configured to determine, based on receiving first sensor data from the first user device (e.g., device 118A), a first facial profile, where the first facial profile is associated with the first account. In some such examples, the first user device (e.g., device 118A) may be configured to capture sensor data (e.g., image data, time-of-flight (ToF) data) associated with a respective user via one or more sensors (e.g., cameras, ToF sensors, and/or the like). In such an example, the authentication delegation service 102 may be configured to leverage the recognition component of the natural language processing system 100 to identify the first facial profile by extracting facial feature data comprised in the first sensor data and comparing the facial feature data to stored facial feature data of one or more users (e.g., facial profile data associated with one or more user accounts managed by the natural language processing system 100). In such an example, the facial profile may be associated with the first account associated with the natural language processing system 100 such that the authentication delegation service 102 may be configure to identity the first account based on the facial profile.

The processing may continue at operation 408, at which the recognition component may be configured to determine, based on a first device identifier associated with the first account, a second user device (e.g., device 118B such as a mobile device).

The processing may continue at operation 410, at which the authentication delegation service 102 may be configured to send a first authentication notification (e.g., authentication notification 124) to the second user device (e.g., device 118B). In some examples, the first authentication notification (e.g., authentication notification 124) may be a passkey-based authentication notification and may comprise a first passkey challenge object.

As described herein, the authentication delegation service 102 may leverage the software application instance associated with the natural language processing system 100 to generate the passkey challenge object. The passkey challenge object may be configured to expire after a predetermined amount of time (e.g., ninety seconds, two minutes, or the like). The authentication delegation service 102 may use any suitable method (e.g., a random bit or number generator) to generate the passkey challenge object. In some embodiments, the passkey challenge object is a nonce value. The authentication delegation service 102 may generate the passkey challenge object using any suitable algorithm, such as a random or pseudo-random number generator (e.g., a 128-bit or 256-bit number generator).

In some embodiments, the passkey challenge object may be generated based on a set of passkey generation rules that are determined by the entity associated with natural language processing system 100. For example, the passkey generation rules may require authentication delegation service 102 to generate a passkey challenge object that satisfies a predetermined complexity (e.g., nonce length) to ensure that the passkey challenge object is resistant to brute force attacks. Moreover, the use of a nonce the randomness injected into the passkey challenge object by utilizing a nonce ensures that each passkey authentication challenge is unique, and thus cannot be reused in future authentication challenges. In some embodiments, the authentication delegation service 102 may generate the passkey challenge object so that the passkey challenge object is associated with a timestamp. This may allow the authentication delegation service 102 to enforce a predetermined amount of time that the passkey authentication challenge is valid.

The processing may continue at operation 412, at which the authentication delegation service 102 may be configured to receive, from the second user device (e.g., device 118B), a first authentication response (e.g., authentication response 126). In some examples, the first authentication response may comprise a first passkey challenge signature associated with the first passkey challenge object, where the first passkey challenge signature indicates an execution of a first passkey-based authentication challenge by the second device (e.g., a biometric challenge, memorized secret challenge, facial recognition challenge, or the like).

In some examples, the authentication delegation service 102 may request the second user device (e.g., device 118B) to digitally sign the passkey challenge object using its corresponding private cryptographic key by executing a passkey-based authentication challenge and provide a passkey challenge signature in an authentication response. Additionally or alternatively, the passkey challenge object may include instructions for the second user device (e.g., device 118B) to digitally sign the passkey challenge object by executing a passkey-based authentication challenge and provide the authentication response. In this regard, the authentication response may refer to a cryptographic proof that may be subsequently used to verify that the second user device (e.g., device 118B) is in possession of a private cryptographic key that corresponds to a public cryptographic key of a passkey that is stored in the first account registered with the natural language processing system 100. Accordingly, the authentication response may be a version of the passkey challenge object that was transformed by second user device (e.g., device 118B) using a private cryptographic key that may be locally stored by second user device (e.g., device 118B) as a result of successfully executing a passkey-based authentication challenge. Additionally or alternatively, the first authentication response 126 (e.g., authentication response 126) may comprise a device signature (e.g., device-specific information related to one or more of a device serial number, device type, and/or other device identifier) that is unique to the second user device (e.g., device 118B). In such examples, the device signature of the second user device (e.g., device 118B) may be associated with the respective passkey associated with the first account. In this regard, the second user device may support authentication mechanisms having a second confidence rating that is stronger than that of the first user device (e.g., authentication mechanisms with a FAR<0.002%, such as passkey authentication).

The processing may continue at operation 414, at which the authentication delegation service 102 may be configured to authenticate the first account based on the first authentication response (e.g., authentication response 126). In some examples, authenticating the first account comprises verifying a first passkey challenge signature based on a public cryptographic key associated with a passkey related to the second device (e.g., device 118B). In particular, the authentication delegation service 102 may check the validity of the passkey challenge signature using the public cryptographic key of the passkey that is stored by the authentication token storage component 108. This allows the authentication delegation service 102 to verify whether second user device (e.g., device 118B) is in possession of the private cryptographic key of the passkey, which in turn, also serves as proof of a user identity that may be used to authenticate the first account that is registered with the natural language processing system 100.

In some examples, if the passkey challenge signature does not correspond to the public cryptographic key, the authentication delegation service 102 may reject the first authentication response and the first account may not be authenticated. The authentication delegation service 102 may perform a cryptographic verification to determine whether the passkey challenge signature correctly corresponds to the original passkey challenge object. If the passkey challenge signature corresponds to the original passkey challenge, the authentication delegation service 102 may determine the passkey challenge signature is successfully authenticated. If the passkey challenge signature fails to correspond to the original passkey challenge, the authentication delegation service 102 may determine the passkey challenge signature has failed authentication. Additionally, the authentication delegation service 102 may utilize the device signature comprised in the authentication response (e.g., authentication response 126) to verify that the second user device (e.g., device 118B) is the user device that originally enrolled in the passkey associated with the first account. If the device signature fails to correspond to a device signature stored with respect to the public cryptographic key of the passkey related to the first account, the authentication delegation service 102 may reject the first authentication response and the first account may not be authenticated.

In some examples, the authentication delegation service 102 may determine the authentication response was received within a threshold time window. The authentication delegation service 102 may use the timestamp associated with the generation of the passkey challenge object and a timestamp associated with the received authentication response to determine whether the authentication response was received within the threshold time window. If no authentication response is received within the threshold time window, the authentication delegation service 102 may determine the passkey challenge signature has failed authentication.

In some examples, if the first account fails to be authenticated, the authentication delegation service 102 may generate additional passkey challenge objects and provide the additional passkey challenge objects up to a threshold number of times (e.g., three times). If a passkey challenge signature from an additional authentication response is successfully authenticated, the first account may be successfully authenticated. If none of the passkey challenge signatures from the additional authentication responses are authenticated, the authentication delegation service 102 may fail to authenticate the first account.

Upon successful authentication of the first account based on the passkey, the authentication delegation service 102 may leveraged the session management component 111 to initiate a first delegated authentication session for the first user device (e.g., device 118A), where the first device may be authorized to access the first enterprise data during the first delegated authentication session. In this regard, the authentication delegation service 102 may generate a first API call associated with the first natural language request, where the first API call is configured to retrieve the first enterprise data associated with the first natural language request from the enterprise service (e.g., enterprise service 112), and where the first API call comprises the authentication token associated with an enterprise service account. Accordingly, the authentication delegation service 102 may receive, based on an execution of the first API call, the first enterprise data from the enterprise service (e.g., enterprise service 112).

The processing may continue at operation 416, at which the authentication delegation service 102 may be configured to send the first enterprise data to the first user device (e.g., device 118A). Additionally or alternatively, as described herein, the authentication delegation service 102 may be configured to leverage the cached enterprise data storage component 110 and/or the search index service 106 to store the enterprise data. Furthermore, as described herein, the enterprise data may be utilized by a software application instance associated with the natural language processing system 100 to provide the enterprise data via the first user device (e.g., device 118B). For example, as described herein with reference to FIG. 2, various enterprise data (e.g., obscured enterprise data) may be displayed via a user interface configured to display an interactive calendar (e.g., interactive calendar 200). Alternatively, in some examples, the first device (e.g., device 118A) may be configured to receive the first enterprise data from the enterprise service (e.g., enterprise service 112) directly. For example, based on an execution of the first API call, the first enterprise data may be sent from the enterprise service (e.g., enterprise service 112) directly to the first device (e.g., device 118A).

Additionally, in some examples, the enterprise data may be provided to one or more additional user devices to which the respective delegated authentication session has been extended. As described herein, the session management component 111 may be configured to extend a respective delegated authentication session to include multiple additional user devices (one or more co-located smart home devices, e.g., device 118C) within a given environment of the first user device (e.g., device 118A) based on various co-location data. In some examples, such co-location data may comprise a combination of signals including co-wake data, BLE beaconing data, and/or user device network identifier data.

Co-wake data may indicate that two or more user devices (e.g., device 118A and device 118C) are positioned in a given environment such that the two or more user devices are within listening distance of one another. In such an example, the respective wakeword detection components of the two or more user devices may process audio data associated with a predetermined wakeword and may be entered into a sending mode, audio capturing mode, and/or other type of processing mode simultaneously by the same wakeword uttered by a respective user. As such, the authentication delegation service 102 may be configured to determine that two or more co-located user devices (e.g., device 118A and device 118C) have been activated simultaneously based on a single natural language request (e.g., an utterance associated with input data 116).

In such examples, if the first user device (e.g., device 118A) is authorized to access enterprise data during a respective delegated authentication session, the authentication delegation service 102 may be configured to authorize one or more co-located user devices (e.g., device 118C) based on co-wake data indicating the one or more co-located user devices were activated at the same time the first user device was activated and upon a determination that the one or more additional user devices are compliant with predetermined conditional access policies. For example, the authentication delegation service 102 may leverage the device posture assessment service 104 to determine that the one or more co-located user devices are compliant with the predetermined conditional access policies based on one or more device compliance signals 122A-122N received from the one or more co-located user devices.

Additionally or alternatively, the first user device (e.g., device 118A) may be configured to generate and/or transmit BLE beaconing signals to one or more co-located user devices (e.g., device 118C) in the given environment of the first user device. In some examples, upon initiation of a delegated authentication session for the first user device (e.g., device 118A), the software application instance associated with the natural language processing system 100 may cause the first device to transmit BLE beaconing signals to one or more co-located user devices in the given environment. In this regard, the device posture assessment service 104 may be configured to manage a list of device identifiers related to one or more known user devices associated with a first account of the natural language processing system 100 (e.g., a list associated with a "family of devices" related to the first account).

As such, the first user device (e.g., device 118A) may be caused to transmit BLE beaconing signals to one or more co-located user devices indicated by the list of known user devices associated with the first account. In some examples, the BLE beaconing signals may indicate that a delegated authentication session has been initiated for the first user device (e.g., device 118A). Additionally, the BLE beaconing signals may comprise instructions that cause a receiving user device (a co-located smart home device, e.g., device 118C) to send device compliance signals 122A-122N to the device posture assessment service 104 so the device posture assessment service 104 may determine whether the receiving user device is compliant with the predetermined conditional access policies. In such examples, if a security status of the receiving user device (e.g., device 118C) indicates the receiving user device is compliant with the predetermined conditional access policies, the current delegated authentication session may be safely extended to the receiving user device.

Additionally or alternatively, the authentication delegation service 102 may be configured to determine whether to extend a respective delegated authentication session to one or more co-located user devices (e.g., device 118C) based on a respective network identifier associated with the one or more co-located devices. In some such examples, the list of known user devices managed by the device posture assessment service 104 may indicate various network identifiers of the one or more known devices, as well as network identifiers associated with the communications network by which the known devices have accessed the natural language processing system 100 in the past within a predetermined time frame (e.g., within the past thirty days, or any other suitable time range).

In this regard, the authentication delegation service 102 may work in conjunction with the device posture assessment service 104 to track the authentication history and/or the network access history of the one or more known devices associated with the first account. In such examples, the authentication delegation service 102 may be configured to query one or more co-located user devices on the list of known user devices (e.g., device 118C) to determine whether the one or more co-located user devices are currently configured to access the natural language processing system 100 via the same communications network as the first user device (e.g., device 118A) for which a delegated authentication session is currently active. If the one or more co-located user devices (e.g., device 118C) respond to the authentication delegation service 102 with an acknowledgment indicating the one or more co-located user devices are currently on the same communications network and are configured to communicate with the natural language processing system 100, the authentication delegation service 102 may leverage the device posture assessment service 104 to determine the security status of the one or more user co-located user devices (e.g., whether the user devices are compliant the predetermined conditional access policies).

Additionally or alternatively, in some examples, the authentication delegation service 102 may be configured to leverage the device posture assessment service 104 to determine a co-location confidence score indicating whether one or more co-located user devices (e.g., device 118C) are indeed located in a same environment as the first user device (e.g., device 118A). In some such examples, the co-location confidence score is generated based on co-location data comprising one or more of co-wake data associated with the first request to access enterprise data, BLE beaconing data, and/or network identifier data associated with the first user device (e.g., device 118A) and the one or more co-located user devices (e.g., device 118C). In some examples, various co-location may be weighted differently by the device posture assessment service 104. For example, co-wake data associated with two or more user devices (e.g., device 118A and device 118C) may be weighted higher relative to network identifier data associated with the two or more user devices such that the confirmation of the co-wake data causes a larger relative increase in the co-location confidence score than the network identifier data. In some such examples, the weights associated with the various co-location data may be defined by the conditional access policies enforced by a respective authentication delegation service 102.

Additionally, the device posture assessment service 104 may be configured to determine whether a co-location confidence score satisfies a predetermined co-location confidence threshold (e.g., a colocation confidence threshold of 90%, or any other suitable percentage). In some examples, the predetermined co-location confidence threshold may be defined by the by the conditional access policies enforced by a respective authentication delegation service 102. For example, the authentication delegation service 102 may enforce conditional access policies associated with a respective enterprise service 112. As such, in some examples, the respective enterprise service 112 may be enabled to define the co-location confidence threshold.

If the co-location confidence score satisfies the predetermined co-location confidence threshold, the device posture assessment service 104 may be configured to determine a security status of the one or more co-located user devices (e.g., device 118C). Upon a determination that the security status of the one or more co-located user devices (e.g., device 118C) indicates compliance with the predetermined conditional access policies (e.g., based on one or more device compliance signals 122A-122N), the authentication delegation service 102 may extend the current delegated authentication session to the one or more co-located user devices.

Figure 5:
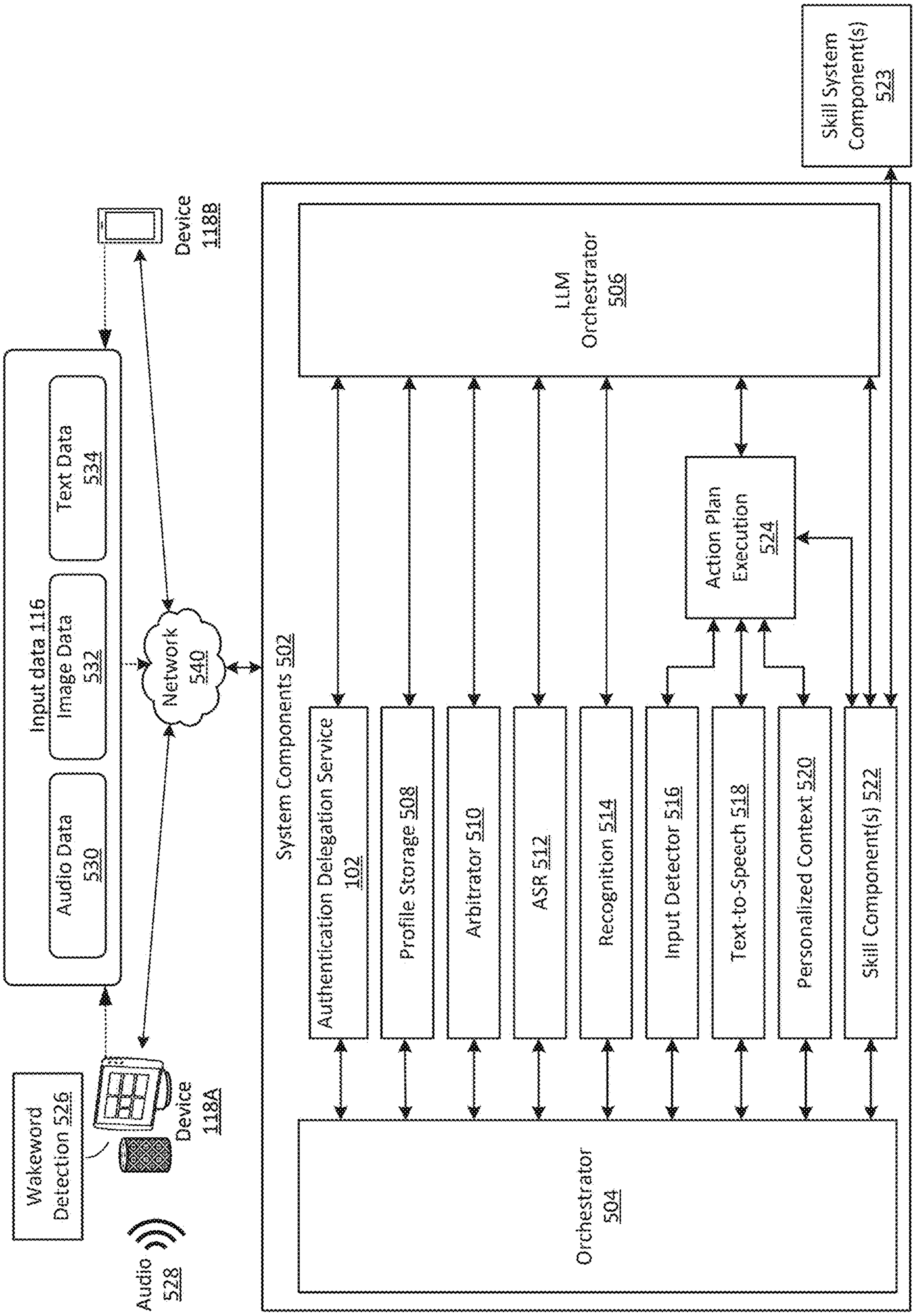
FIG. 5 illustrates a block diagram of an example architecture related to system components of a natural language processing system in accordance with various aspects of the present disclosure.

FIG. 5 illustrates an example architecture related to system components 502 of a natural language processing system 100 configured for device authentication delegation. In some examples, the authentication delegation service 102 may operate using various components as described in FIG. 5. The various components may be located on same or different physical devices. Communication between various components may occur directly or across a network 540 (e.g., a telecommunications network (e.g., a 5G network), wide area network (WAN), local area network (LAN), wireless Internet network, and/or the like capable of facilitating remote network communications). A user device (e.g., device 118A) may include audio capture component(s), such as a microphone or array of microphones of a user device (e.g., device 118A), captures audio 528 and creates corresponding audio data. Once speech is detected in audio data representing the audio 528, the user device (e.g., device 118A) may determine if the speech is directed at the user device/system component(s). In at least some examples, such determination may be made using a wakeword detection component 526.

The wakeword detection component 526 may be configured to detect various wakewords. In at least some examples, each wakeword may correspond to a name of a different digital assistant. An example wakeword/digital assistant name is "Alexa." In another example, input to the system may be in form of text data 534, for example as a result of a user typing an input into a user interface of user device (e.g., device 118A). Other input forms may include indication that the user has pressed a physical or virtual button on user device (e.g., device 118A), the user has made a gesture, etc. The user device (e.g., device 118A) may also capture images using camera(s) of the user device and may send image data 532 representing those image(s) to the system component(s). The image data 532 may include raw image data or image data processed by the user device (e.g., device 118A) before sending to the system component(s). The image data 532 may be associated with input data 116 and may be used in various manners by different components of the system to perform operations such as determining whether a user is directing an utterance to the system, interpreting a user command, responding to a user command, etc.

The wakeword detection component 526 of the user device (e.g., device 118A) may process the audio data, representing the audio 528, to determine whether speech is represented therein. The user device (e.g., device 118A) may use various techniques to determine whether the audio data includes speech. In some examples, the user device (e.g., device 118A) may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device (e.g., device 118A) may implement a classifier configured to distinguish speech from background noise. The classifier may be implemented by techniques such as linear classifiers, support vector machines, and decision trees. In still other examples, the user device (e.g., device 118A) may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 528, is analyzed to determine if specific characteristics of the audio data match preconfigured acoustic waveforms, audio signatures, or other data corresponding to a wakeword.

Thus, the wakeword detection component 526 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 526 may be built on deep neural network (DNN)/recursive neural network (RNN) structures directly, without HMM being involved. Such an architecture may estimate the posteriors of wakewords with context data, either by stacking frames within a context window for DNN or using RNN. Follow-on posterior threshold tuning or smoothing is applied for decision making. Other techniques for wakeword detection, such as those known in the art, may also be used.

Once the wakeword is detected by the wakeword detection component 526 and/or input is detected by an input detector, the user device (e.g., device 118A) may "wake" (e.g., enter into a particular processing mode) and begin transmitting audio data 530 (e.g., associated with input data 116 related to a natural language request), representing the audio 528, to the system components 502. The audio data 530 may include data corresponding to the wakeword; in other examples, the portion of the audio corresponding to the wakeword is removed by the user device (e.g., device 118A) prior to sending the audio data 530 to the system components 502. In the case of touch input detection or gesture based input detection, the audio data may not include a wakeword.

In some implementations, the system may include more than one system component(s). The system components 502 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 526 may result in sending audio data to system component(s) for processing while detection of the wakeword "Computer" by the wakeword detector may result in sending audio data to system component(s) b for processing. The system may have a separate wakeword and system for different skills/systems (e.g., "Dungeon Master" for a game play skill/system component(s)) and/or such skills/systems may be coordinated by one or more skill component(s) 522 of one or more system components 502.

The system components 502 may also include a system directed input detector 516. The system directed input detector 516 may be configured to determine whether an input to the system (for example speech, a gesture, etc.) is directed to the system or not directed to the system (for example directed to another user, etc.). The system directed input detector 516 may work in conjunction with the wakeword detection component 526. If data is being processed the user device may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 516 determines an input is not directed to the system (such as a speech or gesture directed to another user) the user device (e.g., device 118A) may discard the data and take no further action for processing purposes. In this way the system may prevent processing of data not directed to the system, thus protecting user privacy. As an indicator to the user, however, the system may output an audio, visual, or other indicator when the system directed input detector 516 is determining whether an input is potentially device directed. For example, the system may output an orange indicator while considering an input and may output a green indicator if a system directed input is detected. Other such configurations are possible.

Upon receipt by the system components 502, audio data 530 may be sent to an orchestrator component 504 and/or the LLM orchestrator component 506. The orchestrator component 504 may include memory and logic that enables the orchestrator component 504 to transmit various pieces and forms of data to various components of the system, as well as perform other operations as described herein. In some examples, the orchestrator component 504 may optionally be included in the system components 502. In examples where the orchestrator component 504 is not included in the system components 502, the audio data 530 may be sent directly to the LLM orchestrator component 506. Further, in such examples, each of the components of the system components 502 may be configured to interact with the LLM orchestrator component 506, an action plan execution component 524, and/or an API provider component.

In some examples, the system components 502 may include an arbitrator component 510, which may be configured to determine whether the orchestrator component 504 and/or the LLM orchestrator component 506 are to process with respect to the audio data 530. In some examples, the LLM orchestrator component 506 may be selected to process with respect to the audio data 530 only if the user associated with the audio data 530 (or the user device that captured the audio 528) has previously indicated that the LLM orchestrator component 506 may be selected to process with respect to user inputs received from the user.

In some examples, the arbitrator component 510 may determine the orchestrator component 504 and/or the LLM orchestrator component 506 are to process with respect to the audio data 530 based on metadata associated with the audio data 530. For example, the arbitrator component 510 may be a classifier configured to process a natural language representation of the audio data 530 (e.g., output by the ASR component 512) and classify the corresponding user input as to be processed by the orchestrator component 504 and/or the LLM orchestrator component 506. For further example, the arbitrator component 510 may determine whether the device from which the audio data 530 is received is associated with an indicator representing the audio data 530 is to be processed by the orchestrator component 504 and/or the LLM orchestrator component 506. As an even further example, the arbitrator component 510 may determine whether the user (e.g., determined using data output from the recognition component 514) from which the audio data 530 is received is associated with a user profile including an indicator representing the audio data 530 is to be processed by the orchestrator component 504 and/or the LLM orchestrator component 506. As another example, the arbitrator component 510 may determine whether the audio data 530 (or the output of the ASR component 512) corresponds to a request representing that the audio data 530 is to be processed by the orchestrator component 504 and/or the LLM orchestrator component 506 (e.g., a request including "let's talk" may represent that the audio data 530 is to be processed by the LLM orchestrator component 506).

In some examples, if the arbitrator component 510 is unsure (e.g., a confidence score corresponding to whether the orchestrator component 504 and/or the LLM orchestrator component 506 is to process is below a threshold), then the arbitrator component 510 may send the audio data 530 to both of the orchestrator component 504 and the LLM orchestrator component 506. In such examples, the orchestrator component 504 and/or the LLM orchestrator component 506 may include further logic for determining further confidence scores during processing representing whether the orchestrator component 504 and/or the LLM orchestrator component 506 should continue processing, as is discussed further herein below.

The arbitrator component 510 may send the audio data 530 to an ASR component 512. In some examples, the component selected to process the audio data 530 (e.g., the orchestrator component 504 and/or the LLM orchestrator component 506) may send the audio data 530 to the ASR component 512. The ASR component 512 may transcribe the audio data 530 into text data. The text data output by the ASR component 512 represents one or more than one (e.g., in the form of an N-best list) ASR hypotheses representing speech represented in the audio data 530. The ASR component 512 interprets the speech in the audio data 530 based on a similarity between the audio data 530 and pre-established language models. For example, the ASR component 512 may compare the audio data 530 with models for sounds (e.g., acoustic units such as phonemes, phones, etc.) and sequences of sounds to identify words that match the sequence of sounds of the speech represented in the audio data 530. The ASR component 512 sends the text data generated thereby to the arbitrator component 510, the orchestrator component 504, and/or the LLM orchestrator component 506. In instances where the text data is sent to the arbitrator component 510, the arbitrator component 510 may send the text data to the component selected to process the audio data 530 (e.g., the orchestrator component 504 and/or the LLM orchestrator component 506). The text data sent from the ASR component 512 to the arbitrator component 510, the orchestrator component 504, and/or the LLM orchestrator component 506 may include a single top-scoring ASR hypothesis or may include an N-best list including multiple top-scoring ASR hypotheses. An N-best list may additionally include a respective score associated with each ASR hypothesis represented therein.

In some examples, the orchestrator component 504 may cause a NLU component (not shown) to perform processing with respect to the ASR data generated by the ASR component 512. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the user device, the system components 502, a skill component(s) 522, a skill system component(s) 523, etc.) to execute the intent. For example, if the ASR data corresponds to "play Clair de lune by Debussy," the NLU component may determine an intent that the system output music and may identify "Debussy" as an artist/composer and "Clair de lune" as the piece of music to be played. For further example, if the ASR data corresponds to "what is the weather," the NLU component may determine an intent that the system output weather information associated with a geographic location of the user device. In another example, if the ASR data corresponds to "turn off the lights," the NLU component may determine an intent that the system turn off lights associated with the user device or the user. However, if the NLU component is unable to resolve the entity—for example, because the entity is referred to by anaphora such as "this song" or "my next appointment"—the system can send a decode request to another natural language processing system for information regarding the entity mentioned and/or other context related to the utterance. The natural language processing system may augment, correct, or base results data upon the ASR data as well as any data received from the system.

The NLU component may return NLU results data (which may include tagged text data, indicators of intent, etc.) back to the orchestrator component 504. The orchestrator component 504 may forward the NLU results data to a skill component(s) 522. If the NLU results data includes a single NLU hypothesis, the NLU component and the orchestrator component 504 may direct the NLU results data to the skill component(s) 522 associated with the NLU hypothesis. If the NLU results data includes an N-best list of NLU hypotheses, the NLU component and the orchestrator component 504 may direct the top scoring NLU hypothesis to a skill component(s) 522 associated with the top scoring NLU hypothesis. The system may also include a post-NLU ranker which may incorporate other information to rank potential interpretations determined by the NLU component.

In some examples, after determining that the orchestrator component 504 and/or the LLM orchestrator component 506 should process with respect to the input data 116, the arbitrator component 510 may be configured to periodically determine whether the orchestrator component 504 and/or the LLM orchestrator component 506 should continue processing with respect to the input data 116. For example, after a particular point in the processing of the orchestrator component 504 (e.g., after performing NLU, prior to determining a skill component(s) 522 to process with respect to the input data 116, prior to performing an action responsive to the user input, etc.) and/or the LLM orchestrator component 506 (e.g., after selecting a task to be completed, after receiving the action response data from the one or more components, after completing a task, prior to performing an action responsive to the user input, etc.) the orchestrator component 504 and/or the LLM orchestrator component 506 may query the arbitrator component 510 has determined that the orchestrator component 504 and/or the LLM orchestrator component 506 should halt processing with respect to the input data 116.

As discussed above, the system may be configured to stream portions of data associated with processing with respect to a user input to the one or more components such that the one or more components may begin performing their configured processing with respect to that data as soon as it is available to the one or more components. As such, the arbitrator component 510 may cause the orchestrator component 504 and/or the LLM orchestrator component 506 to begin processing with respect to a user input as soon as a portion of data associated with the input data 116 is available (e.g., the ASR data, context data, output of the recognition component 514). Thereafter, once the arbitrator component 510 has enough data to perform the processing described herein above to determine whether the orchestrator component 504 and/or the LLM orchestrator component 506 is to process with respect to the user input, the arbitrator component 510 may inform the corresponding component (e.g., the orchestrator component 504 and/or the LLM orchestrator component 506) to continue/halt processing with respect to the user input at one of the logical checkpoints in the processing of the orchestrator component 504 and/or the LLM orchestrator component 506.

In some examples, a language model shortlister component (e.g., via an API retriever component and/or a shortlister language model) may be configured to select the orchestrator component 504 to process with respect to the user input and/or a current task to return action response data representing a response to the user input/current task or a description of an action the orchestrator component 504 may cause to be performed in response to the user input/current task. As such, in some examples, although the LLM orchestrator component 506 is determined to process with respect to a user input, the LLM orchestrator component 506 may determine, during such processing, that the orchestrator component 504 should process with respect to the user input.

A skill system component(s) 523 may communicate with a skill component(s) 522 within the system components 502 directly with the orchestrator component 504 and/or the action plan execution component 524, or with other components. A skill system component(s) 523 may be configured to perform one or more actions. An ability to perform such action(s) may sometimes be referred to as a "skill." That is, a skill may enable a skill system component(s) 523 to execute specific functionality in order to provide data or perform some other action requested by a user. For example, a weather service skill may enable a skill system component(s) 523 to provide weather information to the system components 502, a car service skill may enable a skill system component(s) 523 to book a trip with respect to a taxi or ride sharing service, an order pizza skill may enable a skill system component(s) 523 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system components 502 may be configured with a skill component(s) 522 dedicated to interacting with the skill system component(s) 523. Unless expressly stated otherwise, reference to a skill, skill device, or skill component may include a skill component(s) 522 operated by the system components 502 and/or skill operated by the skill system component(s) 523. Moreover, the functionality described herein as a skill or skill may be referred to using many different terms, such as an action, bot, app, or the like. The skill component(s) 522 and or skill system component (s) 523 may return output data to the orchestrator component 504.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multiturn "goal-oriented" dialog systems typically need to recognize, retain, and use information collected during more than one input during a back-and-forth or "multi-turn" interaction with the user.

The system component(s) includes a text-to-speech (TTS) component 518. The TTS component 518 may generate audio data (e.g., synthesized speech) from text data using one or more different methods. Text data input to the TTS component 518 may come from a skill component(s) 522, the orchestrator component 504, or another component of the system. In one method of synthesis called unit selection, the TTS component 518 matches text data against a database of recorded speech. The TTS component 518 selects matching units of recorded speech and concatenates the units together to form audio data. In another method of synthesis called parametric synthesis, the TTS component 518 varies parameters such as frequency, volume, and noise to create audio data including an artificial speech waveform. Parametric synthesis uses a computerized voice generator, sometimes called a vocoder.

The user device (e.g., device 118A) may include still image and/or video capture components such as a camera or cameras to capture one or more images. The user device (e.g., device 118A) may include circuitry for digitizing the images and/or video for transmission to the system components 502 as image data. The user device (e.g., device 118A) may further include circuitry for voice command-based control of the camera, allowing a user to request capture of image or video data. The user device (e.g., device 118A) may process the commands locally or send audio data 530 representing the commands to the system components 502 for processing, after which the system components 502 may return output data that can cause the user device (e.g., device 118A) to engage its camera.

The system components 502/the user device (e.g., device 118A) may include a recognition component 514 that recognizes one or more users using a variety of data. However, the disclosure is not limited thereto, and the user device (e.g., device 118A) may include the recognition component 514 instead of and/or in addition to the system components 502 without departing from the disclosure.

The recognition component 514 may take as input the audio data 530 and/or text data output by the ASR component 512. The recognition component 514 may perform user recognition by comparing audio characteristics in the audio data 530 to stored audio characteristics of users. The recognition component 514 may also perform user recognition by comparing biometric data (e.g., fingerprint data, iris data, etc.), received by the system in correlation with the present user input, to stored biometric data of users assuming user permission and previous authorization. The recognition component 514 may further perform user recognition by comparing image data (e.g., including a representation of at least a feature of a user), received by the system in correlation with the present user input, with stored image data including representations of features of different users. The recognition component 514 may perform additional user recognition processes, including those known in the art.

The recognition component 514 determines scores indicating whether user input originated from a particular user. For example, a first score may indicate a likelihood that the user input originated from a first user, a second score may indicate a likelihood that the user input originated from a second user, etc. The recognition component 514 also determines an overall confidence regarding the accuracy of user recognition operations.

Output of the recognition component 514 may include a single user identifier corresponding to the most likely user that originated the user input. Alternatively, output of the recognition component 514 may include an N-best list of user identifiers with respective scores indicating likelihoods of respective users originating the user input. The output of the recognition component 514 may be used to inform processing of the arbitrator component 510, the orchestrator component 504, and/or the LLM orchestrator component 506 as well as processing performed by other components of the system.

The system components 502/user device (e.g., device 118A) may include a presence detection component that determines the presence and/or location of one or more users using a variety of data.

The system (either on the user device (e.g., device 118A), the system component(s), or a combination thereof) may include profile storage for storing a variety of information related to individual users, groups of users, accounts, devices, etc. that interact with the system. As used herein, a "profile" refers to a set of data associated with a user, a group of users, an account, a device, etc. associated with the natural language processing system 100. The data of a profile may include preferences specific to the user, account, device, etc.; input and output capabilities of the device; internet connectivity information; user bibliographic information; subscription information, as well as other information.

The profile storage 508 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user (e.g., devices 118A-118C). For instance, the user account may include one or more IP addresses, MAC addresses, and/or device identifiers, such as a serial number, of each additional electronic device associated with the identified user account. When a user logs into to an application installed on a user device (e.g., device 118A), the user profile (associated with the presented login information) may be updated to include information about the user device, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 508 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 508 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 5 may be illustrated as part of system components 502, a user device (e.g., device 118A), or otherwise, the components may be arranged in other device(s) (such as in the user device if illustrated in system components 502 or vice-versa, or in other device(s) altogether) without departing from the disclosure.

In at least some examples, the system component(s) may receive the audio data 530 from the user device (e.g., device 118A), to recognize speech corresponding to a spoken input in the received audio data 530, and to perform functions in response to the recognized speech. In at least some examples, these functions involve sending directives (e.g., commands), from the system component(s) to the device 118A (and/or other user devices) to cause the user device to perform an action, such as output an audible response to the spoken input via a loudspeaker(s), and/or control secondary devices in the environment by sending a control command to the secondary devices.

Thus, when the user device (e.g., device 118A) is able to communicate with the system component(s) over the network 540, some or all of the functions capable of being performed by the system component(s) may be performed by sending one or more directives over the network 540 to the user device, which, in turn, may process the directive(s) and perform one or more corresponding actions. For example, the system component(s), using a remote directive that is included in response data (e.g., a remote response), may direct the user device (e.g., device 118A) to output an audible response (e.g., using TTS processing performed by an on-device TTS component) to a user's question via a loudspeaker(s) of (or otherwise associated with) the user device, to output content (e.g., music) via the loudspeaker(s) of (or otherwise associated with) the user device, to display content on a display of (or otherwise associated with) the user device, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user as part of a shopping function, establishing a communication session (e.g., a video call) between the user and another user, and so on.

In at least some examples, a hybrid selector of the user device (e.g., device 118A), may send the audio data 530 to the wakeword detection component 526. If the wakeword detection component 526 detects a wakeword in the audio data 530, the wakeword detection component 526 may send an indication of such detection to the hybrid selector. In response to receiving the indication, the hybrid selector may send the audio data 530 to the system component(s) and/or the ASR component of the user device (e.g., device 118A). The wakeword detection component 526 may also send an indication, to the hybrid selector, representing a wakeword was not detected. In response to receiving such an indication, the hybrid selector may refrain from sending the audio data 530 to the system component(s) and may prevent the ASR component of the user device from further processing the audio data 530. In this situation, the audio data 530 can be discarded.

The user device (e.g., device 118A) may conduct its own speech processing using on-device language processing components, such as an ASR component, similar to the manner discussed herein with respect to the ASR component 512 of the system component(s). The user device (e.g., device 118A) may also internally include, or otherwise have access to, other components such as one or more skill components capable of executing commands based on the output of an orchestrator component, a language model orchestrator component, or other results determined by the user device/system component(s) (which may operate similarly to skill component(s) 522), an arbitrator component (configured to process in a similar manner to that discussed herein above with respect to the arbitrator component 510), an action plan execution component (configured to process in a similar manner to that discussed herein with respect to the action plan execution component 524), a personalized context component (configured to process in a similar manner to that discussed herein with respect to the personalized context component 520), a user recognition component (configured to process in a similar manner to that discussed herein with respect to the recognition component 514 of the system component(s)), profile storage (configured to store similar profile data to that discussed herein with respect to the profile storage 508 of the system component(s)), or other components. In at least some examples, the profile storage may only store profile data for a user or group of users specifically associated with the user device (e.g., device 118A). Similar to as described above with respect to skill component(s) 522, a skill component of the user device (e.g., device 118A) may communicate with a skill system component(s) 523. The user device (e.g., device 118A) may also have its own TTS component, which may operate similarly to TTS component 518.

In at least some examples, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device (e.g., device 118A) attempts to process a natural language user input for which the on-device language processing components are not necessarily best suited, the language processing results determined by the user device may indicate a low confidence or other metric indicating that the processing by the user device may not be as accurate as the processing done by the system component(s).

A hybrid selector, of the user device (e.g., device 118A), may include a hybrid proxy (HP) configured to proxy traffic to/from the system component(s). For example, the HP may be configured to send messages to/from a hybrid execution controller (HEC) of the hybrid selector. For example, command/directive data received from the system component(s) can be sent to the HEC using the HP. The HP may also be configured to allow the audio data 530 to pass to the system component(s) while also receiving (e.g., intercepting) this audio data 530 and sending the audio data 530 to the HEC.

In at least some examples, the hybrid selector may further include a local request orchestrator (LRO) configured to notify the ASR component of the user device (e.g., device 118A) about the availability of new audio data 530 that represents user speech, and to otherwise initiate the operations of local language processing when new audio data 530 becomes available. In general, the hybrid selector may control execution of local language processing, such as by sending "execute" and "terminate" events/instructions. An "execute" event may instruct a component to continue any suspended execution (e.g., by instructing the component to execute on a previously determined intent in order to determine a directive). Meanwhile, a "terminate" event may instruct a component to terminate further execution, such as when the user device (e.g., device 118A) receives directive data from the system component(s) and chooses to use that remotely-determined directive data.

Thus, when the audio data 530 is received, the HP may allow the audio data 530 to pass through to the system component(s) and the HP may also input the audio data 530 to the on-device ASR component by routing the audio data 530 through the HEC of the hybrid selector, whereby the LRO notifies the on-device ASR component of the audio data 530. At this point, the hybrid selector may wait for response data from either or both of the system component(s) or the local language processing components. However, the disclosure is not limited thereto, and in some examples the hybrid selector may send the audio data 530 only to the local ASR component without departing from the disclosure. For example, the user device (e.g., device 118A) may process the audio data 530 locally without sending the audio data 530 to the system component(s).

The local ASR component is configured to receive the audio data 530 from a hybrid selector, and to recognize speech in the audio data 530. The user device (e.g., device 118A) and/or the system component(s) may associate a unique identifier with each natural language user input. The user device (e.g., device 118A) may include the unique identifier when sending the audio data 530 to the system component(s), and the response data from the system component(s) may include the unique identifier to identify which natural language user input the response data corresponds.

In at least some examples, the user device (e.g., device 118A) may include, or be configured to use, one or more skill components that may work similarly to the skill component(s) 522 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device (e.g., device 118A) may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device (e.g., device 118A) may be in communication with one or more skill system component(s) 523. For example, a skill system component(s) 523 may be located in a remote environment (e.g., separate location) such that the user device (e.g., device 118A) may only communicate with the skill system component(s) 523 via the network 540. However, the disclosure is not limited thereto. For example, in at least some examples, a skill system component(s) 523 may be configured in a local environment (e.g., home server and/or the like) such that the user device (e.g., device 118A) may communicate with the skill system component(s) 523 via a private network, such as a local area network (LAN).

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 6:
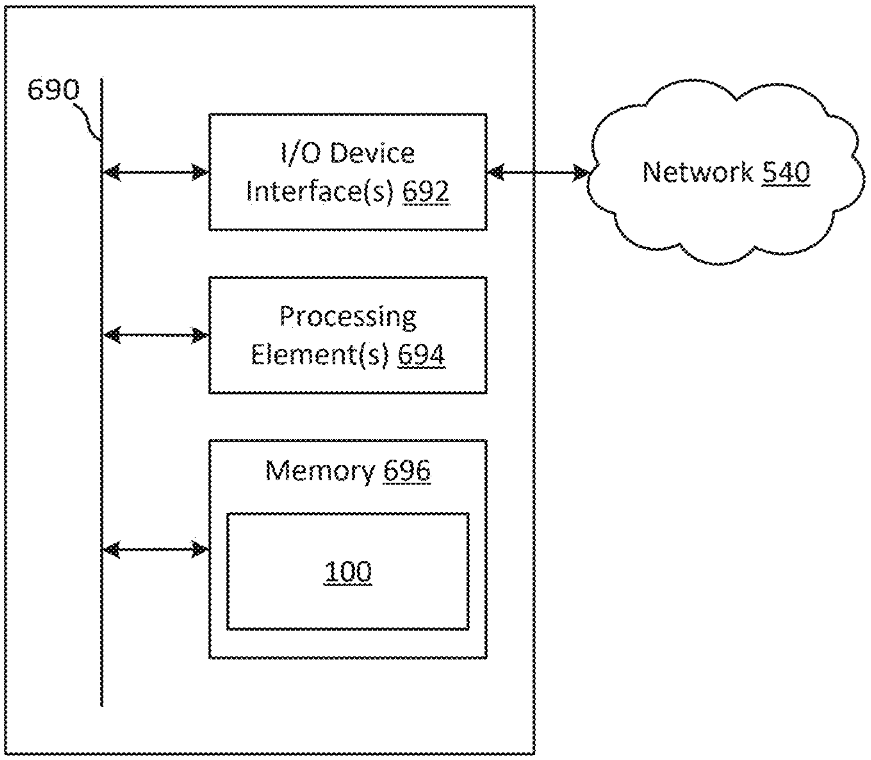
FIG. 6 illustrates a block diagram of an example remote device related to a natural language processing system in accordance with various aspects of the present disclosure.

FIG. 6 is a block diagram conceptually illustrating example components of a remote device, such as a computing device executing a particular skill, executing one or more components of a natural language processing system and/or command processing system. For example, the various components of FIG. 6 may be used to implement various operations associated with the natural language processing system 100. Additionally or alternatively, the various components of FIG. 6 may be used to implement various operations associated with device authentication delegation. Multiple computing devices may be included in the system, such as one speech processing computing device for performing ASR processing, one speech processing computing device for performing NLU processing, one or more skill computing device(s) implementing skills, an LLM-based natural language processing system, etc. In operation, each of these devices (or groups of devices) may include non-transitory computer-readable and computer-executable instructions that reside on the respective device, as will be discussed further below. The remote device of FIG. 6 may communicate with one or more other devices over a network 540 (e.g., a wide area network or local area network).

Each computing device of a natural language processing system may include one or more processing element(s) 694, which may each include at least one central processing unit (CPU) for processing data and computer-readable instructions, and a memory 696 for storing data and instructions of the respective device. In at least some examples, memory 696 may store, for example, a list of N-best intents data that may be generated for particular request data. In some examples, memory 696 may store machine learning models of an LLM, such as machine learned models associated with various multi-head attention modules, when loaded from memory 696. In various further examples, memory 696 may be effective to store instructions effective to program processing element(s) 694 to perform the various techniques described above in reference to FIGS. 1-5.

Accordingly, in FIG. 6, the natural language processing system 100 is depicted as being stored within memory 696, as an example. The memory 696 may individually include volatile random access memory (RAM), non-volatile read only memory (ROM), non-volatile magnetoresistive memory (MRAM), and/or other types of memory. Each computing device of a natural language processing system (and/or a component thereof) may also include memory 696 for storing data and controller/processor-executable instructions. Each memory 696 may individually include one or more non-volatile storage types such as magnetic storage, optical storage, solid-state storage, etc. Each computing device of a natural language processing system may also be connected to removable or external non-volatile memory and/or storage (such as a removable memory card, memory key drive, networked storage, etc.) through respective input/output device interfaces 692. In various examples, the feature data and/or training data used by the various machine learning models may be stored and/or cached in memory 696.

Computer instructions for operating each computing device of a natural language processing system may be executed by the respective device's processing element(s) 694, using the memory 696 as temporary "working" storage at runtime. A device's computer instructions may be stored in a non-transitory manner in non-volatile memory (e.g., a non-transitory computer-readable memory), memory 696, or an external device(s). Alternatively, some or all of the executable instructions may be embedded in hardware or firmware on the respective device in addition to or instead of software.

Each computing device of the various computing devices described herein may include input/output device interfaces 692. A variety of components may be connected through the input/output device interfaces 692, as will be discussed further below. Additionally, each computing device of a natural language processing system may include a data bus 690 for conveying data among components of the respective device. Each component within a computing device of a natural language processing system may also be directly connected to other components in addition to (or instead of) being connected to other components across the data bus 690.

As noted above, multiple devices may be employed in a single system. In such a multi-device system, each of the devices may include different components for performing different aspects of the system's processing. The multiple devices may include overlapping components. The components of a natural language processing system, as described herein, are exemplary, and may be located as a stand-alone device or may be included, in whole or in part, as a component of a larger device or system.

Figure 7:
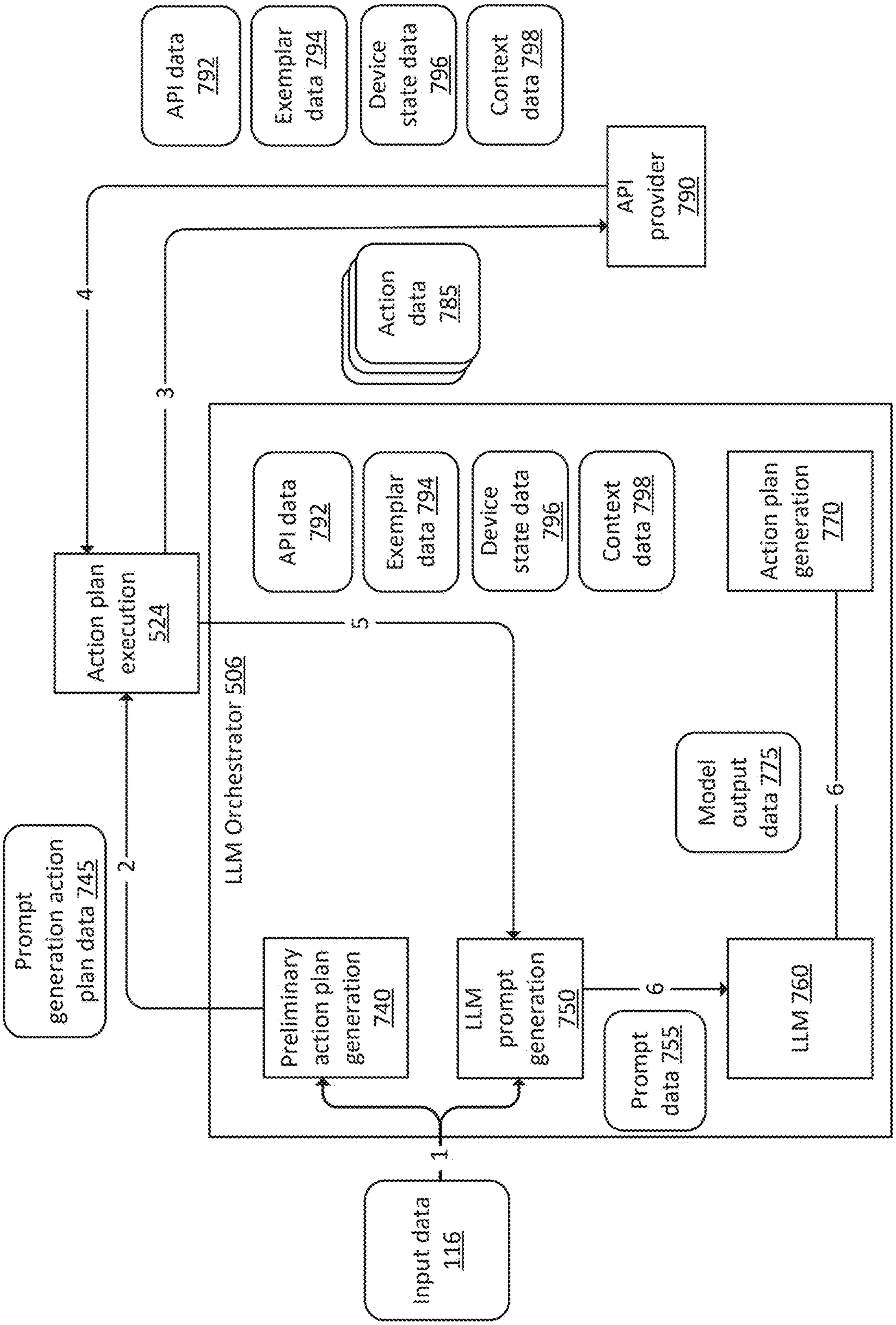
FIG. 7 illustrates a block diagram of an example large language model (LLM)-based natural language processing flow in accordance with various aspects of the present disclosure.

FIG. 7 depicts an example LLM-based natural language processing flow (which may be an example LLM architecture), in accordance with various aspects of the present disclosure. The example architecture in FIG. 7 includes an LLM orchestrator component 506 and various other components for determining an action responsive to a user input. The architecture may further include an action plan execution component 524 and an API provider component 790. With reference to FIG. 7, the LLM orchestrator component 506 may include a preliminary action plan generation component 740, a LLM prompt generation component 750, an LLM 760, and an action plan generation component 770. In various examples, the LLM 760 may be a generative model.

In some examples, the LLM 760 may be a transformer-based seq2seq model involving an encoder-decoder architecture. In some such examples, the LLM 760 may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the LLM 760 may be pre-trained with approximately 1 trillion tokens. Being trained on CLM tasks, the LLM 760 may be capable of in-context learning. An example of such a LLM is Alexa Teacher Model (Alexa™).

In various examples, the input to the LLM 760 may be in the form of a prompt. A prompt may be a natural language input, for example, an instruction, for the LLM 760 to generate an output according to the prompt. The output generated by the LLM 760 may be a natural language output responsive to the prompt. The prompt and the output may be text in a particular spoken language. For example, for an example prompt "how do I cook beans?" the LLM 760 may output a recipe (e.g., a step-by-step process) to cook beans. As another example, for an example prompt "I am hungry. What restaurants in the area are open?" the LLM may output a list of restaurants near the user that are open at the current time.

The LLM 760 may be configured using various learning techniques. In some examples, the LLM 760 may be configured (e.g., "fine-tuned") using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. Additionally or alternatively, in some examples, the LLM 760 may be configured using one-shot learning, which is similar to few-shot learning, except the model is provided with a single example. As another example, the LLM 760 may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

The LLM orchestrator component 506 may be configured for generating the prompt to be used by the LLM 760 to determine an action responsive to a user input. As shown in FIG. 7, the LLM orchestrator component 506 receives (at step 1) input data 116. In some instances, the input data 116 may correspond to a text or tokenized representation of a user input. For example, prior to the LLM orchestrator component 506 receiving the input data 116, another component (e.g., an ASR component) may receive audio data representing the user input. The ASR component may perform ASR processing on the audio data to determine ASR output data corresponding to the user input. As previously described, the ASR component may determine ASR data that includes an ASR N-best list including multiple ASR hypotheses and corresponding confidence scores representing what the user may have said. The ASR hypotheses may include text data, token data, etc. as representing an utterance. The confidence score of each ASR hypothesis may indicate the ASR component's level of confidence that the corresponding hypothesis represents what the user said. The ASR component may also determine token scores corresponding to each token/word of the ASR hypothesis, where the token score indicates the ASR component's level of confidence that the respective token/word was spoken by the user. The token scores may be identified as an entity score when the corresponding token relates to an entity. In some instances, the input data 116 may include a top scoring ASR hypothesis of the ASR data. In addition, entity data recognized using the natural language processing system 100 may be provided as part of the input data 116.

As illustrated in FIG. 7, the input data 116 may be received at the preliminary action plan generation component 740 and the LLM prompt generation component 750 of the LLM orchestrator component 506. The preliminary action plan generation component 740 processes the input data 116 to generate prompt generation action plan data 745 corresponding to an instruction(s) (e.g., a request(s)) for one or more portions of data usable to generate a language model prompt for determining an action responsive to the user input). In some examples, the one or more portions of data may be data that is determined to be relevant for processing of the user input. The one or more portions of data may represent one or more actions (e.g., API definitions), one or more exemplars corresponding to the actions (e.g., example model outputs including an appropriate use of the API), one or more device states corresponding to one or more devices associated with the user input, and/or one or more other contexts associated with the user input. For example, if the input data 116 represents a user input of "please turn on the kitchen lights every morning at 7 am," then the preliminary action plan generation component 740 may determine prompt generation action plan data 745 representing instructions for one or more actions (e.g., API definitions) related to turning on the kitchens lights every morning, one or more exemplars corresponding to the related actions, one or more device states corresponding to one or more devices associated with the "kitchen lights", and one or more other contexts. For further example, if the input data 116 represents a user input of "What is on my agenda today?" then the preliminary action plan generation component 740 may determine prompt generation action plan data 745 representing instructions for one or more actions (e.g., API definitions, specifications, schemas) related to the user input and one or more exemplars corresponding to the related actions, as other information, such as devices states or other contextual information (user profile information, device profile information, weather, time of day, historical interaction history) may not be relevant.

In some examples, the prompt generation action plan data 745 may include one or more executable API calls usable for retrieving the one or more portions of data from the corresponding component. For example, instructions included in the prompt generation action plan data 745 may include "FETCH_API," "FETCH_EXEMPLAR," "FETCH_DEVICE_STATE," "FETCH_CONTEXT," etc., along with optional API arguments/inputs. In some examples, the prompt generation action plan data 745 may also include the input data 116. The prompt generation action plan data 745 may be sent (at step 2) to the action plan execution component 524.

In some examples, the preliminary action plan generation component 740 may be configured to process the input data 116 to determine a representation of the user's request. In various examples, the representation of the user's request may be a reformulation of the user's request. For example, the if the input data 116 represents a user input of "I have a number of meetings today. Please move my lunch meeting with Alice to 2:30 PM," then the preliminary action plan generation component 740 may determine the representation of the user's request as being "Move my lunch meeting with Alice to 2:30 PM," or the like. The preliminary action plan generation component 740 may generate the prompt generation action plan data 745 using the determined representation of the user's request.

In some examples, the preliminary action plan generation component 740 may implement one or more machine learning (ML) models. A first ML model(s) may be configured to take as input the input data 116 and generate a representation of the user's request. For example, the ML model may be a text summarization model or a text rewrite model. A second ML model (or the first ML model) may be configured to take as input the representation of the user's request (or the input data 116) and determine the one or more portions of data relevant for processing of the user input. For example, the second ML model may be a classifier trained to classify the user's request (or the input data 116) to determine data (or types of data) relevant to the processing of the user input (e.g., one or more related actions (e.g., API definitions), one or more exemplars corresponding to the one or more related actions, one or more device states corresponding to one or more related devices, one or more related contexts, etc.)

In other examples, the preliminary action plan generation component 740 may be an LLM, similar to the LLM 760. In such examples, the architecture may include a further component configured to generate a prompt to be provided to the LLM (e.g., similar to the LLM prompt generation component 750) or the prompt may be generated by the LLM prompt generation component 750. The component may generate a prompt (e.g., according to a template) including the input data 116 and instructions to determine the one or more portions of data (or types of data) relevant to the processing of the user input. The LLM may process the prompt and generate model output data representing the one or more portions of data (or types of data). The preliminary action plan generation component 740 may process the model output data to determine the prompt generation action plan data 745.

The action plan execution component 524 may process the prompt generation action plan data 745 to execute the one or more instructions to retrieve/receive data corresponding to the user input (e.g., input data 116 related to a natural language request for enterprise data) and that may be used to generate the language model prompt. As described above, in some examples, the natural language processing system 100 may be used to generate a shortlist of entities likely to have been mentioned in the utterance (e.g., using the top n scoring entities output by the natural language processing system 100). This shortlist of entities can then be inserted into the prompt for LLM inference as context. Engineering the prompt to include the shortlist of entities (resolved using the natural language processing system 100) may improve LLM inference and generate better responses.

As shown in FIG. 7, the action plan execution component 524 processes the prompt generation action plan data 745 to generate action data 785 representing an action included in the prompt generation action plan data 745 (e.g., a single instruction, such as FETCH_CONTEXT). For example, in the situation where the action is represented by an API call, the action data 785 may represent the action plan execution component 524 executing the API call included in the prompt generation action plan data 745. The action data 785 may be sent (at step 3) to the API provider component 790. In the situation where the prompt generation action plan data 745 includes more than one instruction, the action plan execution component 524 may generate more than one instance of action data 785 (e.g., one instance for each instruction included in the prompt generation action plan data 745) and send each instance to the API provider component 790.

The API provider component 790 may process the (one or more instances of the) action data 785 and cause the retrieval of the (one or more portions of) data associated with the action data 785. The API provider component 790 may include a knowledge provider component. The knowledge provider component may include an API retrieval component, an exemplar retrieval component, a device state retrieval component, and an "other" context retrieval component. The knowledge provider component may provide the action data 785 to the component(s) configured to determine the data corresponding to the request(s) represented by the action data 785.

For example, the API retrieval component (not shown) may process the action data 785 to generate API data 792 representing one or more APIs that correspond to an action performable with respect to the user input. For example, if the user input corresponds to "turn on the kitchen light," the API retrieval component may determine an API usable to control a device and include an API definition corresponding to the API in the API data 792. In some examples, the API definition may include one or more API call frameworks for instructing/requesting that the API perform an action (e.g., turn_on_device (device: [device name]), turn_off_device (device: [device name]), set_device_temperature (device: [device name]); temperature: [temperature], set_device_volume (device: [device name]; volume: [volume value]), etc.).

In some examples, the API definition may include a natural language description of the functionality of the API (e.g., a natural language description of the actions performable by the API/API call framework). For example, for the above-mentioned API determined to be associated with the user input of "turn on the kitchen light," the API definition may further include a natural language description of "used to power on a device." In some examples, the one or more API definitions may be included in the API data 792 based on them being semantically similar to the user input. For example, the API retrieval component may be capable of comparing (e.g., using cosine similarity) (an encoded representation of) the user input to (an encoded representation of) the API definition to determine a semantic similarity between the user input and the API definition (e.g., a semantic similarity between the user input and the natural language description of the functionality of the API included in the API definition). If the API definition is determined to be semantically similar to the user input, then the corresponding API definition may be included in the API data 792. In some examples, the API retrieval component may include the top-n identified API definitions in the API data 792. The API data 792 may be sent (at step 4) to the action plan execution component 524 as shown in FIG. 7.

For further example, the exemplar retrieval component may process the action data 785 to generate exemplar data 794 representing one or more exemplars associated with one or more APIs (e.g., the API represented by the API data 792). As used herein, an "exemplar" associated with an API corresponds to an example use of the API (e.g., an example language model output including use of the API (e.g., via a corresponding API call) with respect to a user input, where the user input is similar to the current user input. For example, for an API associated with the API call framework "turn_on_device (device: [device name])," and the current user input "please turn on the kitchen lights" the exemplar retrieval component may select an exemplar including the example user input of "please turn on the lights" and the API call of "turn_on_device (device="lights")." In some examples, an exemplar represented in the exemplar data 794 may include an example user input, a natural language description of an action associated with the example user input, an executable API call associated with the example user input and the action associated with the example user input, an example result of the API call, a natural language description of an action to be performed in response to the example result of the API call, and/or an output responsive to the user input. For example, for an API associated with the API call frameworks "Routine.create_turn_on_action(device: str)" and "Routine.create_time_trigger(hour: [hour value])" and the current user input "please turn on the kitchen light every day at 7 am," the exemplar retrieval component may select an exemplar representing:

```
{
Customer: turn on the kitchen light every day at 7am
Thought: the customer is trying to create a routine
Action:
Routine.create_routine(trigger=Routine.create_time_trigger(hour=
7), action=Routine.create_turn_on_action(device="kitchen light"))
Observation: routine created successfully
Thought: time to respond
Response: I have created a routine for you. Anything else?
}
```

Although not illustrated in FIG. 7, in some examples, the API provider component 790 and/or a knowledge provider component may provide the exemplar retrieval component with the action data 785 and a list of API call(s) to which the determined exemplars are to be associated (e.g., the API call(s) included in the API data 792). In some examples, the one or more exemplars may be included in the exemplar data 794 based on them being semantically similar to the user input. For example, the exemplar retrieval component may be capable of comparing (e.g., using cosine similarity) the current user input to the example user input included in an exemplar to determine a semantic similarity between the current user input and the example user input. If the example user input is determined to be semantically similar to the current user input, then the corresponding exemplar may be included in the exemplar data 794. In some examples, the exemplar retrieval component may include the top-n identified exemplars in the exemplar data 794. The exemplar data 794 may be sent (at step 4) to the action plan execution component 524 as shown in FIG. 7.

As another example, a device state retrieval component (not shown in FIG. 7) may process the action data 785 to generate device state data 796 representing one or more states of one or more devices associated with/relevant to the user input (e.g., whether the device is powered on or off, a volume level associated with the device, etc.). For example, if the user input corresponds to "Please turn on the kitchen light," the device state data 796 may represent the state(s) of one or more devices that are associated with a functionality of turning on a light, are associated with the kitchen, are associated with a user profile of a user who provided the user input, etc. In some examples, the device(s) may be determined to be relevant based on a device location(s). For example, devices (e.g., microwave, oven, fridge, smart speaker, etc.) near the user device (e.g., located in the kitchen) that received the user input may be used to determine the device state data 796. In some examples, the one or more devices may be determined to be relevant to the user input based on device profile information. For example, the device state retrieval component may be capable of comparing device profile information for a device (e.g., device ID, device group ID, a location associated with the device, etc.) to the user input to determine whether the device is relevant to the user input. In some examples, the device state retrieval component may include the top-n identified device states in the device state data 796. The device state data 796 may be sent (at step 4) to the action plan execution component 524 as shown in FIG. 7.

As a further example, a context retrieval component (not shown) may process the action data 785 to generate other context data 798 (apart from the device state data 796, the API data 792, the exemplar data 794, etc.) representing one or more contexts associated with/relevant to the user input. For example, the other context data 798 may represent user profile information (age, gender, associated devices, user preferences, etc.), visual context (e.g., content being displayed by devices associated with the user profile, content being displayed by the user device that captured the user input, etc.), knowledge context (e.g., one or more previous user inputs and/or system generated responses, etc.), time of day, geographic/device location, weather information, etc. In some examples, the other context retrieval component may include the top-n identified context in the other context data 798. The other context data 798 may be sent (at step 4) to the action plan execution component 524 as shown in FIG. 7.

In some examples, the knowledge provider component may be configured to cause one or more of the API retrieval components, the exemplar retrieval component, the device state retrieval component, and the other context retrieval component to process based on the data output by one or more of the components of the knowledge provider component. For example, if the output of the API retrieval component (e.g., the API data 792) indicates that a related API definition was identified, then the knowledge provider component (or another component) may cause the exemplar retrieval component to process to determine one or more exemplars related to the identified API definitions. For further example, if the output of the API retrieval component (e.g., the API data 792) indicates that a particular API definition was identified (e.g., an API definition for controlling a device), then the knowledge provider component may cause the exemplar retrieval component to process as described above, and may further cause the device state retrieval component and/or the other context retrieval component to process to determine device states for one or more related devices and/or other contextual information based on the identified API definition being associated with controlling a device. In some examples, the knowledge provider component may determine to cause the components to process based on instruction(s) included in the action data (e.g., based on a determination made by preliminary action plan generation component 740, as discussed above).

The action plan execution component 524 may send (step 5) the data received from the API provider component 790 (e.g., the API data 792, the exemplar data 794, the device state data 796, and the other context data 798) to the LLM prompt generation component 750. The LLM prompt generation component 750 may be configured to generate prompt data 755 (e.g., using the input data 116, the API data 792, the exemplar data 794, the device state data 796, and/or the other context data 798) to be used by the LLM 760.

In some examples, the LLM prompt generation component 750 may generate the prompt data 755 representing a prompt for input to the LLM 760. In some examples, such prompt data 755 may be generated based on combining the input data 116, the API data 792, the exemplar data 794, the device state data 796, and the other context data 798. The prompt data 755 may be an instruction to determine an action(s) responsive to the input data 116 given the other information (e.g., the API data 792, the exemplar data 794, the device state data 796, the other context data 798) included in the prompt data 755. In some examples, the LLM prompt generation component 750 may also include in the prompt data 755 a sample processing format to be used by the LLM 760 when processing the prompt and generating the response. In some examples, the prompt data 755 may be generated according to a template format. For example, the prompt data 755 may adhere to a template format of:

```
{
You have access to the following API's:
[API(s) (e.g., the API data 792)]
Use the following format:
User: the utterance of a user
Thought: optionally think about what to do
Action: take an action by calling APIs
Observation: what the API execution returns
. . . (this thought/action/action input/observation can repeat N times)
Thought: done
Response: the proper response to the user (end of turn)
Examples:
[Exemplar(s) (e.g., the exemplar data 794)]
Context: [device state(s) (e.g., the device state data 796)] [other
context(s) (e.g., the other context data 798)]
User: [the user input (e.g., the input data 116)]
}
```

In some examples, the template format may instruct the LLM 760 as to how it should process to determine the action responsive to the user input and/or how it should generate the output including the action response to the user input. For example, as shown in the example above, the format may include the label "User:" labelling the following string of characters/tokens as the user input. For further example, the format may include the label "Thought:" instructing the LLM 760 to generate an output representing the determined interpretation of the user input by the LLM 760 (e.g., the user is requesting [intent of the user input], the user is trying to [intent of the user Input], etc.) As another example, the format may include the label "Observation:" labeling the following string of characters/tokens as the result of performance of an action determined by the LLM 760/the LLM 760's interpretation of the result of the performance of the action determined by the LLM 760. As a further example, the format may include a label of "Response:" instructing the LLM 760 to generate a response (e.g., a natural language output for a user) to the prompt.

Following such a template format, for example, and for a user input of "turn on the living room light" and corresponding API data, exemplar data, device state data, and other context data, the LLM prompt generation component 750 may generate example prompt data **755*a***:

```
{
You have access to the following API's:
Routine.turn_on_device (device: [device name]) turns a device on.
Use the following format:
User: the utterance of a user
Thought: optionally think about what to do
Action: take an action by calling APIs
Observation: what the API execution returns
. . . (this thought/action/action input/observation can repeat N times)
Thought: done
Response: the proper response to the user (end of turn)
Examples:
User: turn on all indoor lights
Thought: the user is trying to turn lights on
Action: turn_on_device (device="indoor light 1")
turn_on_device (device="indoor light 2")
Observation: success
Thought: time to respond
Response: Anything else I can help you with?
Context: the user has the following devices, bathroom light,
bedroom light, kitchen light, and living room light.
User: turn on the living room light.
}
```

In some examples, the LLM prompt generation component 750 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The LLM 760 processes the prompt data 755 to generate model output data 775 representing an action responsive to the user input. For example, based on processing the example prompt data provided above, the LLM 760 may output model output data 775: {"Thought: the user is trying to turn on the living room light; Action: turn_on_device (device="living room light"),"} or the like. The model output data 775 is sent (at step 7) to the action plan generation component 770. The action plan generation component 770 may parse the model output data 775 to determine action plan data representing the action generated by the LLM 760. For example, for the model output data 775: "Action: turn_on_device (device="living room light")," the corresponding action plan data may correspond to "turn_on_device (device="living room light")" (e.g., corresponding to the action generated by the LLM 760, without the label of "Action"). In some examples, the action plan generation component 770 may determine an API call corresponding to the "Action" data included in the model output data 775. For example, the action plan generation component 770 may fill in the arguments/inputs, if any, for the API call, which may be included in the action plan data. For further example, the action plan execution component 524 may fill in the arguments/inputs, if any, for the API call.

In some examples, the LLM orchestrator component 506 (e.g., the action plan generation component 770 or another component of the LLM orchestrator component 506) may determine whether the LLM 760 output satisfies certain conditions. Such conditions may relate to checking whether the output includes biased information (e.g., bias towards a protected class), harmful information (e.g., violence-related content, harmful content), profanity, content based on model hallucinations, etc. A model hallucination refers to when a model (e.g., a language model) generates a confident response that is not grounded in any of its training data. For example, the model may generate a response including a random number, which is not an accurate response to an input prompt, and then the model may continue to falsely represent that the random number is an accurate response to future input prompts. To check for an output being based on model hallucinations, the LLM orchestrator component 506 may use a knowledge base, web search, etc. to fact-check information included in the output.

Figure 8:
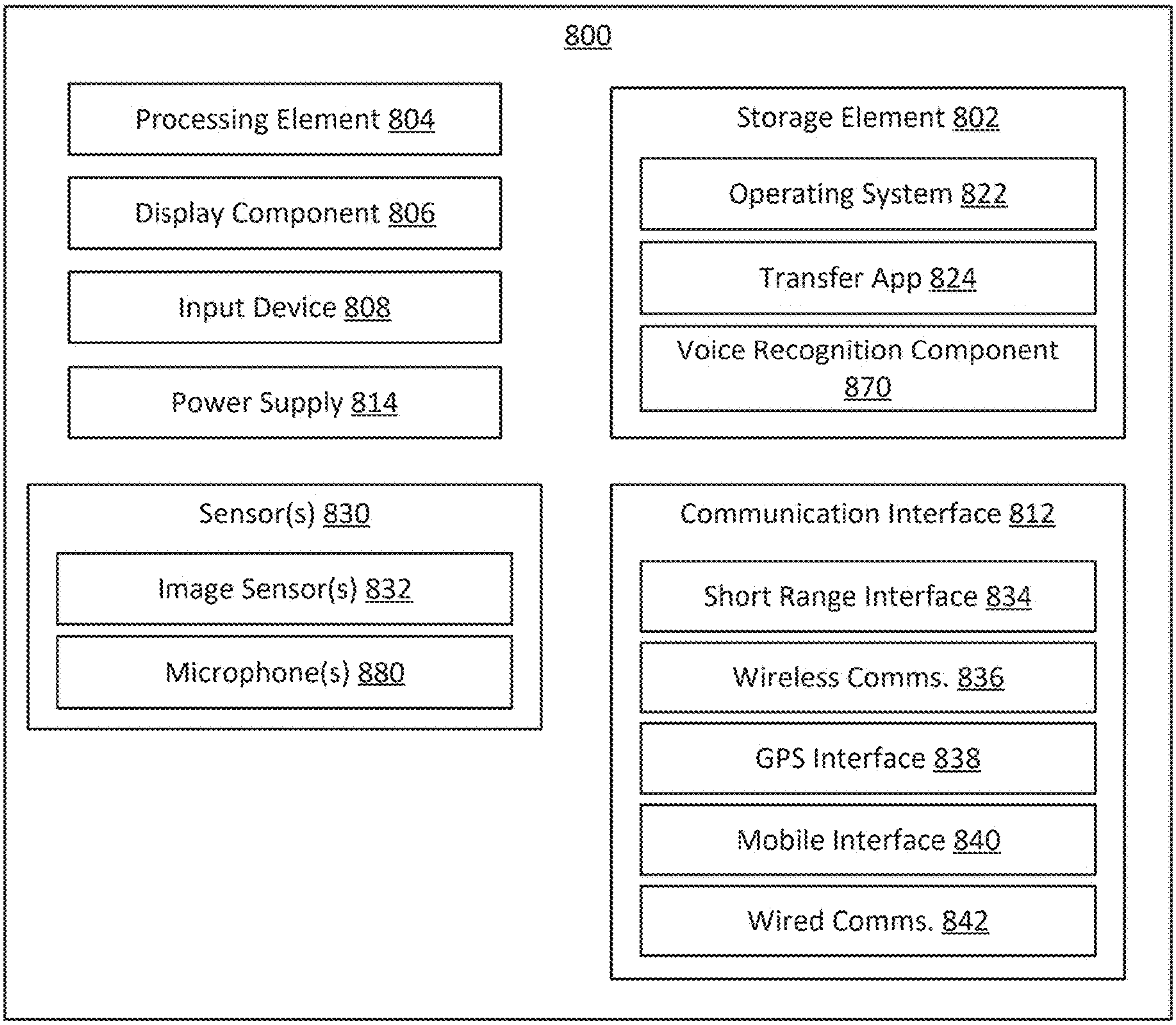
FIG. 8 illustrates a block diagram of an example architecture of a network-connected device in accordance with various aspects of the present disclosure.

FIG. 8 is a block diagram showing an example architecture 800 of a network-connected device (e.g., a local network-connected device such as a natural language processing-enabled device (e.g., device 118A) or another input device) that may be used to implement, at least in part, a voice assistant and/or other speech processing functionality configured to receive spoken and/or other natural input commands, in accordance with various aspects of the present disclosure. It will be appreciated that not all devices will include all of the components of the architecture 800 and some user devices may include additional components not shown in the architecture 800. The architecture 800 may include one or more processing elements 804 for executing instructions and retrieving data stored in a storage element 802. The processing element 804 may comprise at least one processor. Any suitable processor or processors may be used. For example, the processing element 804 may comprise one or more digital signal processors (DSPs). In some examples, the processing element 804 may be effective to determine a wakeword and/or to stream audio data to a natural language processing system. The storage element 802 can include one or more different types of memory, data storage, or computer-readable storage media devoted to different purposes within the architecture 800. For example, the storage element 802 may comprise flash memory, random-access memory, disk-based storage, etc. Different portions of the storage element 802, for example, may be used for program instructions for execution by the processing element 804, storage of images or other digital works, and/or a removable storage for transferring data to other devices, etc. In various examples, the storage element 802 may comprise one or more components of the natural language processing system 100.

The storage element 802 may also store software for execution by the processing element 804. An operating system 822 may provide the user with an interface for operating the computing device and may facilitate communications and commands between applications executing on the architecture 800 and various hardware thereof. A transfer application 824 may be configured to receive images, audio, and/or video from another device (e.g., a mobile device, image capture device, and/or display device) or from an image sensor 832 and/or microphone 880 included in the architecture 800. In some examples, the transfer application 824 may also be configured to send the received voice requests to one or more voice recognition servers.

When implemented in some user devices, the architecture 800 may also comprise a display component 806. The display component 806 may comprise one or more light-emitting diodes (LEDs) or other suitable display lamps. Also, in some examples, the display component 806 may comprise, for example, one or more devices such as cathode ray tubes (CRTs), liquid-crystal display (LCD) screens, gas plasma-based flat panel displays, LCD projectors, raster projectors, infrared projectors, or other types of display devices, etc. As described herein, display component 806 may be effective to display content determined provided by a skill executed by the processing element 804 and/or by another computing device.

The architecture 800 may also include one or more input devices 808 operable to receive inputs from a user. The input devices 808 can include, for example, a push button, touch pad, touch screen, wheel, joystick, keyboard, mouse, trackball, keypad, light gun, game controller, or any other such device or element whereby a user can provide inputs to the architecture 800. These input devices 808 may be incorporated into the architecture 800 or operably coupled to the architecture 800 via wired or wireless interface. In some examples, architecture 800 may include a microphone 880 or an array of microphones for capturing sounds, such as voice requests. Voice recognition component 870 may interpret audio signals of sound captured by microphone 880. In some examples, voice recognition component 870 may listen for a "wakeword" to be received by microphone 880. Upon receipt of the wakeword, voice recognition component 870 may stream audio to a voice recognition server for analysis, such as a natural language processing system. In various examples, voice recognition component 870 may stream audio to external computing devices via communication interface 812.

When the display component 806 includes a touch-sensitive display, the input devices 808 can include a touch sensor that operates in conjunction with the display component 806 to permit users to interact with the image displayed by the display component 806 using touch inputs (e.g., with a finger or stylus). The architecture 800 may also include a power supply 814, such as a wired alternating current (AC) converter, a rechargeable battery operable to be recharged through conventional plug-in approaches, or through other approaches such as capacitive or inductive charging.

The communication interface 812 may comprise one or more wired or wireless components operable to communicate with one or more other computing devices. For example, the communication interface 812 may comprise a wireless communication module 836 configured to communicate on a network, such as a computer communication network, according to any suitable wireless protocol, such as IEEE 802.11 or another suitable wireless local area network (WLAN) protocol. A short range interface 834 may be configured to communicate using one or more short range wireless protocols such as, for example, near field communications (NFC), Bluetooth, Bluetooth LE, etc. A mobile interface 840 may be configured to communicate utilizing a cellular or other mobile protocol. A Global Positioning System (GPS) interface 838 may be in communication with one or more earth-orbiting satellites or other suitable position-determining systems to identify a position of the architecture 800. A wired communication module 842 may be configured to communicate according to the USB protocol or any other suitable protocol.

The architecture 800 may also include one or more sensor(s) 830 such as, for example, one or more position sensors, image sensors, and/or motion sensors. An image sensor 832 is shown in FIG. 8. An example of an image sensor 832 may be a camera configured to capture color information, image geometry information, and/or ambient light information.

Various systems and processes described herein may include or be implemented using or in conjunction with or for a device or electronic device. A device or electronic device may be, for example, one or more of a smart home device, digital assistant device, multimedia device, networked device, desktop computer, laptop computer, tablet computer, smartphone, wearable device (e.g., headset, smartwatches, smart glasses, etc.), kiosk, and/or similar electronic devices. As used herein, computing devices such as smartphones, laptop computers, tablet computers, and/or wearable devices may generally be referred to as mobile devices.

As set forth above, certain methods or process blocks may be skipped or omitted in some implementations. Blocks or operations may be added to some implementations. The methods and processes described herein are also not limited to any particular sequence or order, and the blocks or operations relating thereto can be performed in other sequences or orders that are appropriate. For example, described blocks or operations may be performed in an order other than that specifically disclosed, or multiple blocks or operations may be combined in a single block or state. For instance, two or more blocks or operations may be executed concurrently or with partial concurrence. The example blocks or operations may be performed in serial, in parallel, or in some other manner. For example, the order of execution of two or more blocks or operations may be scrambled relative to the order described. For instance, two or more blocks or operations may be executed concurrently or with partial concurrence. It is understood that all such variations are within the scope of the present disclosure.

It should be emphasized that the above-described examples of the present disclosure are merely possible examples of implementations set forth for a clear understanding of the principles of the disclosure. Many variations and modifications may be made to the above-described example(s) without departing substantially from the spirit and principles of the disclosure. The various features and processes described above may be used independently of one another or may be combined in various ways. All possible combinations and sub-combinations are intended to fall within the scope of this disclosure.

In addition, conditional language, such as, among others, “can,” “could,” “might,” or “may,” unless specifically stated otherwise, or otherwise understood within the context as used, is generally intended to convey that certain examples include, while other examples do not include, certain features, elements, and/or steps.

Although this disclosure has been described in terms of certain examples and applications, other examples and applications that are apparent to those of ordinary skill in the art, including examples and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A natural language processing system comprising:

a processor; and non-transitory computer-readable memory storing instructions that, when executed by the processor, are effective to cause:

an authentication delegation service to:

receive, from a first device, first input data comprising a first utterance, the first utterance is associated with a first request to access first enterprise data managed by a third-party (3P) enterprise service;

a device posture assessment service to:

determine, based on a first set of device compliance signals received from the first device, a first security status of the first device, the first security status to indicate that the first device complies with a set of predetermined conditional access policies; and a recognition component to:

determine based on the first utterance, a first voice profile;

determine, based on the first voice profile, a first account registered with the natural language processing system;

determine, based on a first device identifier associated with the first account, a second device;

the authentication delegation service to:

send a first passkey-based authentication notification to the second device, wherein the first passkey-based authentication notification comprises a first passkey challenge object;

receive, from the second device, a first passkey response, the first passkey response comprising a first passkey challenge signature associated with the first passkey challenge object, and the first passkey challenge signature to indicate an execution of a first authentication challenge by the second device;

authenticate the first account based on the first passkey response by verifying the first passkey challenge signature based on a public cryptographic key associated with a passkey related to the second device;

upon successful authentication of the first account based on the passkey, initiate a first delegated authentication session for the first device, the first device authorized to access the first enterprise data during the first delegated authentication session;

generate a first application programming interface (API) call associated with the first utterance, the first API call configured to retrieve the first enterprise data associated with the first utterance from the 3P enterprise service, and the first API call comprising an authentication token associated with an enterprise service account;

receive, based on an execution of the first API call, the first enterprise data from the 3P enterprise service; and store the first enterprise data in a storage device associated with the natural language processing system.

2. The natural language processing system of claim 1, wherein the instructions, when executed by the processor, are effective to cause the authentication delegation service to:

prior to authorizing the first device to access the first enterprise data, receive, based on an interaction with a software application instance associated with the natural language processing system, an enterprise service account linking request, the enterprise service account linking request a request to link the first account associated with the natural language processing system to the enterprise service account;

receive, upon successful authentication of the enterprise service account by the 3P enterprise service, the authentication token associated with the enterprise service account from the 3P enterprise service, wherein the authentication token is a refreshable authentication token;

generate the passkey associated with the first account associated with the natural language processing system, the passkey comprising a public-private cryptographic key pair and a device signature associated with the second device;

store the public cryptographic key of the passkey with relation to the first account, wherein a private cryptographic key of the passkey is stored by the second device; and link the authentication token associated with the enterprise service account to the first account associated with the natural language processing system.

3. The natural language processing system of claim 1, wherein the first enterprise data comprises calendar event data associated with the enterprise service account.

4. A computer-implemented method comprising:

receiving, from a first device, first input data comprising a first request to access first enterprise data managed by an enterprise service;

determining, based on execution of a first authentication mechanism having a first confidence rating, a first account, the first account associated with a natural language processing system;

determining, based on a first device identifier associated with the first account, a second device;

sending a first authentication notification to the second device;

receiving, from the second device, a first authentication response, the first authentication response to indicate an execution of a second authentication mechanism having a second confidence rating by the second device;

authenticating the first account based on the first authentication response and, upon successful authentication of the first account, initiating a first delegated authentication session for the first device, the first device authorized to access the first enterprise data during the first delegated authentication session; and sending the first enterprise data to the first device.

5. The computer-implemented method of claim 4, wherein the computer-implemented method further comprises:

prior to authorizing the first device to access the first enterprise data, receiving, based on an interaction with a software application instance associated with the natural language processing system, an enterprise service account linking request, the enterprise service account linking request a request to link the first account associated with the natural language processing system to an enterprise service account;

receiving, upon successful authentication of the enterprise service account by the enterprise service, an authentication token associated with the enterprise service account from the enterprise service;

generating a passkey associated with the first account associated with the natural language processing system, the passkey comprising a public-private cryptographic key pair and a device signature associated with the second device;

storing a public cryptographic key of the passkey with relation to the first account, wherein a private cryptographic key of the passkey is stored by the second device; and linking the authentication token associated with the enterprise service account to the first account associated with the natural language processing system.

6. The computer-implemented method of claim 4, wherein the first enterprise data comprises calendar event data associated with an enterprise service account.

7. The computer-implemented method of claim 4, wherein the first confidence rating of the first authentication mechanism is a lower confidence rating relative to the second confidence rating of the second authentication mechanism.

8. The computer-implemented method of claim 7, wherein the first request is a first natural language request and determining the first account based on the execution of the first authentication mechanism further comprises:

determining, based on the first natural language request, a first voice profile associated with the first account.

9. The computer-implemented method of claim 8, wherein determining the first account based on the execution of the first authentication mechanism further comprises:

determining, based on receiving first sensor data from the first device, a first facial profile associated with the first account.

10. The computer-implemented method of claim 4, wherein the second authentication mechanism is a passkey-based authentication mechanism comprising:

receiving, from the second device, the first authentication response comprising a first passkey challenge signature to indicate an execution of a first authentication challenge by the second device, the first authentication response comprising a device signature associated with the second device.

11. The computer-implemented method of claim 4, wherein the computer-implemented method further comprises:

generating, based on the first enterprise data, first tokenized enterprise data; and storing the first tokenized enterprise data in a first search index.

12. The computer-implemented method of claim 11, wherein the computer-implemented method further comprises:

receiving, from the first device, second input data comprising a second natural language request to access second enterprise data;

determining a first access intent associated with the second natural language request;

querying the first search index based on the first access intent; and sending the second enterprise data to the first device.

13. The computer-implemented method of claim 4, wherein the computer-implemented method further comprises:

generating, based on the first enterprise data, first obscured enterprise data; and causing simultaneous display of the first obscured enterprise data and first personal data associated with the first account on the first device.

14. The computer-implemented method of claim 13, wherein the computer-implemented method further comprises:

receiving third input data, wherein the third input data comprises a selection indication associated with the first obscured enterprise data displayed on the first device;

authenticating the first account, wherein authenticating the first account comprises:

determining a delegated authentication session status related to the first device, the delegated authentication session status to indicate whether a delegated authentication session is currently active for the first device, upon a determination that a delegated authentication session is not currently active for the first device, sending a second authentication notification to the second device, receiving, from the second device, a second authentication response to indicate an execution of the second authentication mechanism by the second device, the second authentication mechanism a passkey-based authentication mechanism, and authenticating the first account based on the second authentication response received from the second device, the second authentication response comprising a second passkey challenge signature associated with a second passkey challenge object, the second passkey challenge signature to indicate an execution of a second authentication challenge on the second device, and the second authentication response comprising a device signature associated with the second device; and sending the first enterprise data associated with the first obscured enterprise data to the first device.

15. The computer-implemented method of claim 13, wherein the computer-implemented method further comprises:

generating, based on the first obscured enterprise data, an enterprise data alert; and sending the enterprise data alert to the first device.

16. The computer-implemented method of claim 4, wherein authorizing the first device to access the first enterprise data during the first delegated authentication session enables the first device to initiate one or more enterprise data creation actions, enterprise data reading actions, enterprise data updating actions, or enterprise data deletion actions.

17. The computer-implemented method of claim 4, wherein the computer-implemented method further comprises determining a first security status of the first device, the first security status to indicate that the first device complies with a first conditional access policy.

18. The computer-implemented method of claim 17, wherein the first conditional access policy is based on one or more enterprise standards associated with the enterprise service.

19. The computer-implemented method of claim 17, wherein the computer-implemented method further comprises:

determining, based on a first co-location confidence score, that a third device is in a same environment as the first device, the first co-location confidence score generated based on first co-location data comprising one or more of co-wake data associated with the first request, Bluetooth low energy (BLE) beaconing data, or network identifier data associated with the first device and the third device;

determining whether the first co-location confidence score satisfies a predetermined co-location confidence threshold defined by the first conditional access policy;

determining, upon a determination that the first co-location confidence score satisfies the predetermined co-location confidence threshold, a second security status of the third device, the second security status to indicate the third device complies with the first conditional access policy; and extending the first delegated authentication session to the third device to authorize the third device to access the first enterprise data during the first delegated authentication session and to initiate one or more enterprise data creation actions, enterprise data reading actions, enterprise data updating actions, or enterprise data deletion actions.

20. A system comprising:

at least one processor; and non-transitory computer-readable memory storing instructions that, when executed by the at least one processor, are effective to perform operations comprising:

receiving, from a first device, first input data comprising a first request to access first enterprise data managed by an enterprise service;

determining, based on execution of a first authentication mechanism having a first confidence rating, a first account, the first account associated with a natural language processing system;

determining, based on a first device identifier associated with the first account, a second device;

sending a first authentication notification to the second device;

receiving, from the second device, a first authentication response, the first authentication response to indicate an execution of a second authentication mechanism having a second confidence rating by the second device;

authenticating the first account based on the first authentication response and, upon successful authentication of the first account, initiating a first delegated authentication session for the first device, the first device authorized to access the first enterprise data during the first delegated authentication session; and sending the first enterprise data to the first device.

* * * * *